US007933367B2

(12) United States Patent
Kroeger et al.

(10) Patent No.: US 7,933,367 B2
(45) Date of Patent: Apr. 26, 2011

(54) METHOD AND APPARATUS FOR IMPLEMENTING SEEK AND SCAN FUNCTIONS FOR AN FM DIGITAL RADIO SIGNAL

(75) Inventors: Brian William Kroeger, Sykesville, MD (US); Paul J. Peyla, Elkridge, MD (US)

(73) Assignee: iBiquity Digital Corporation, Columbia, MD (US)

( * ) Notice: Subject to any disclaimer, the term of this patent is extended or adjusted under 35 U.S.C. 154(b) by 874 days.

(21) Appl. No.: 11/757,513

(22) Filed: Jun. 4, 2007

(65) Prior Publication Data

US 2008/0298440 A1 Dec. 4, 2008

(51) Int. Cl.
*H04L 27/08* (2006.01)

(52) U.S. Cl. ........................................................ 375/343

(58) Field of Classification Search .................. 375/142, 375/150, 260, 270, 277, 321, 340, 342–343; 307/208, 210, 503, 509, 514; 370/208, 210, 370/503, 509, 514

See application file for complete search history.

(56) References Cited

U.S. PATENT DOCUMENTS 6,021,165 A 2/2000 Ohkubo et al.
6,192,056 B1 2/2001 Tsuruoka
6,493,544 B1 12/2002 Baxley et al.
6,539,063 B1 3/2003 Peyla et al.
6,549,589 B1 4/2003 Tsuruoka
6,714,771 B1 3/2004 Nagy et al.
6,850,743 B2 2/2005 Davis et al.
6,891,898 B2 5/2005 Peyla et al.
7,224,714 B1 * 5/2007 Barman et al. ................ 375/140
7,315,566 B2 * 1/2008 Tanno et al. .................. 375/142
7,321,631 B1 * 1/2008 Choi et al. .................... 375/260
2004/0071200 A1 * 4/2004 Betz et al. ..................... 375/152
2005/0232431 A1 10/2005 Kato
2006/0018413 A1 * 1/2006 Gupta ........................... 375/343
2006/0209941 A1 9/2006 Kroeger
2007/0049223 A1 3/2007 Nishizawa et al.

(Continued)

FOREIGN PATENT DOCUMENTS

EP 0834998 A2 4/1998

(Continued)

OTHER PUBLICATIONS

U.S. Appl. No. 11/757,574, filed Jun. 4, 2007, Peyla et al.

(Continued)

*Primary Examiner* — Khanh C Tran
(74) *Attorney, Agent, or Firm* — Robert P. Lenart, Esq.; Pietragallo Gordon Alfano Bosick & Raspanti, LLP

(57) ABSTRACT

A method for detecting a digital radio signal includes the steps of receiving the digital radio signal, developing a correlation waveform having a peak that corresponds to a symbol boundary, normalizing the correlation waveform, calculating a peak value of the normalized correlation waveform, and dwelling on the received digital radio signal when the peak value exceeds a predetermined threshold. A receiver that performs the method is also provided.

28 Claims, 20 Drawing Sheets

U.S. PATENT DOCUMENTS

| | | | | |
|---|---|---|---|---|
| 2007/0092045 | A1 | 4/2007 | Woo et al. | |
| 2007/0280098 | A1* | 12/2007 | Bhatt et al. | 370/208 |
| 2009/0041167 | A1 | 2/2009 | Kadota et al. | |

FOREIGN PATENT DOCUMENTS

| | | | |
|---|---|---|---|
| EP | 0944194 | A2 | 9/1999 |
| EP | 0944213 | A2 | 9/1999 |
| EP | 0952714 | A2 | 10/1999 |
| EP | 1376970 | A2 | 1/2004 |
| EP | 0952714 | B1 | 12/2005 |
| EP | 1798885 | A1 | 6/2007 |

OTHER PUBLICATIONS

National Radio Systems Committee, NRSC-5-A, In-band/on-channel Digital Radio Broadcasting Standard, Sep. 2005, 42 pgs.

J.-J. Van De Beek et al., "ML Estimation of Time and Frequency Offset in OFDM Systems", IEEE Transactions on Signal Processing, vol. 45, No. 7, Jul. 1997, pp. 1800-1805.

* cited by examiner

METHOD AND APPARATUS FOR IMPLEMENTING SEEK AND SCAN FUNCTIONS FOR AN FM DIGITAL RADIO SIGNAL

FIELD OF THE INVENTION

This invention relates to digital radio broadcasting receivers, and more particularly to methods and apparatus for implementing in a digital radio receiver functions to seek and scan for FM digital signals.

BACKGROUND OF THE INVENTION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

Multicasting, the ability to deliver several programs or data streams over one channel in the AM or FM spectrum, enables stations to broadcast multiple streams of data on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC DAB can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio™ technology is an implementation of the NRSC-5A IBOC standard. Further information regarding HD Radio™ technology can be found at www.hdradio.com and www.ibiquity.com.

Other types of digital radio broadcasting systems include satellite systems such as XM Radio, Sirius and WorldSpace, and terrestrial systems such as Digital Radio Mondiale (DRM), Eureka 147 (branded as DAB), DAB Version 2, and FMeXtra. As used herein, the phrase "digital radio broadcasting" encompasses digital audio broadcasting including in-band on-channel broadcasting, as well as other digital terrestrial broadcasting and satellite broadcasting.

Radio receivers can include seek and scan functions in which the receiver searches for available signals of interest. Some existing HD Radio™ receivers use an "HD Acquired" status parameter from the baseband processor to detect the presence of digital sidebands and thereby conclude that a digital signal is present. However, this approach is time-consuming and prone to false alarms. It would be desirable to have a more effective and accurate metric for implementing a seek-scan function in digital radio receivers. It would also be desirable for this metric to be quickly obtained, and to be effective and reliable for finding FM hybrid and all-digital signals. It would also be desirable to minimize any changes to existing HD Radio™ receiver hardware or software when implementing a seek-scan function.

SUMMARY OF THE INVENTION

In a first aspect, the invention provides a method for detecting a digital radio signal. The digital radio signal represents a series of symbols, each of which is comprised of a plurality of samples. The method includes the steps of receiving the digital radio signal, developing a correlation waveform having a peak that corresponds to a symbol boundary, normalizing the correlation waveform, calculating a peak value of the normalized correlation waveform, and dwelling on the received digital radio signal when the peak value exceeds a predetermined threshold.

The digital radio signal can comprise upper and lower sidebands, and the method can be applied independently to each of the sidebands to produce the peak values of normalized correlation waveforms for each of the sidebands. In addition, the method can include calculating the peak index corresponding to the peak value for the normalized correlation waveforms for the upper and lower sidebands. Then a peak index delta representative of the difference between the peak indices for the upper and lower sidebands can be determined and the peak index delta and the peak values for the upper and lower sidebands can be compared to thresholds to determine if a receiver should dwell on the received digital radio signal or tune to another channel.

In another aspect, the invention provides a receiver for detecting a digital radio signal. The digital radio signal represents a series of symbols, each of which is comprised of a plurality of samples. The receiver includes an input for receiving a digital radio signal, and a processor for calculating a peak value of a normalized correlation waveform having a peak that corresponds to a symbol boundary, and for causing the receiver to dwell on the received digital radio signal when the peak value exceeds a predetermined threshold.

DETAILED DESCRIPTION OF THE INVENTION

FIGS. 1-13 and the accompanying description herein provide a general description of an IBOC system, including broadcasting equipment structure and operation, receiver structure and operation, and the structure of IBOC DAB waveforms. FIGS. 14-24 and the accompanying description herein provide a detailed description of the structure and operation of an acquisition module for implementing a seek-scan function according to an aspect of the present invention.

IBOC System and Waveforms

Figure 1:
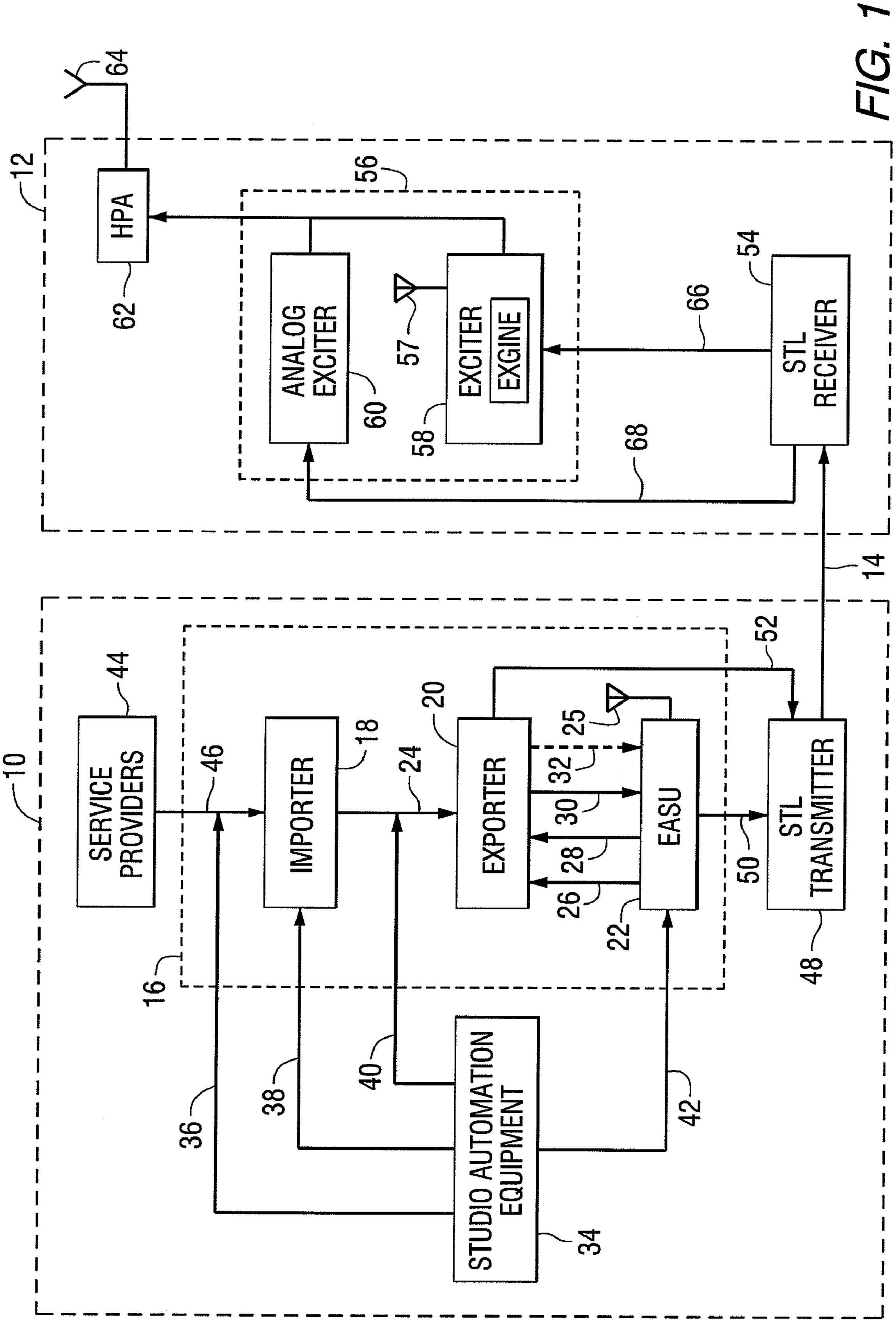
FIG. 1 is a block diagram of a transmitter for use in an in-band on-channel digital radio broadcasting system.

Referring to the drawings, FIG. 1 is a functional block diagram of the relevant components of a studio site 10, an FM transmitter site 12, and a studio transmitter link (STL) 14 that can be used to broadcast an FM IBOC DAB signal. The studio site includes, among other things, studio automation equipment 34, an Ensemble Operations Center (EOC) 16 that includes an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 2:
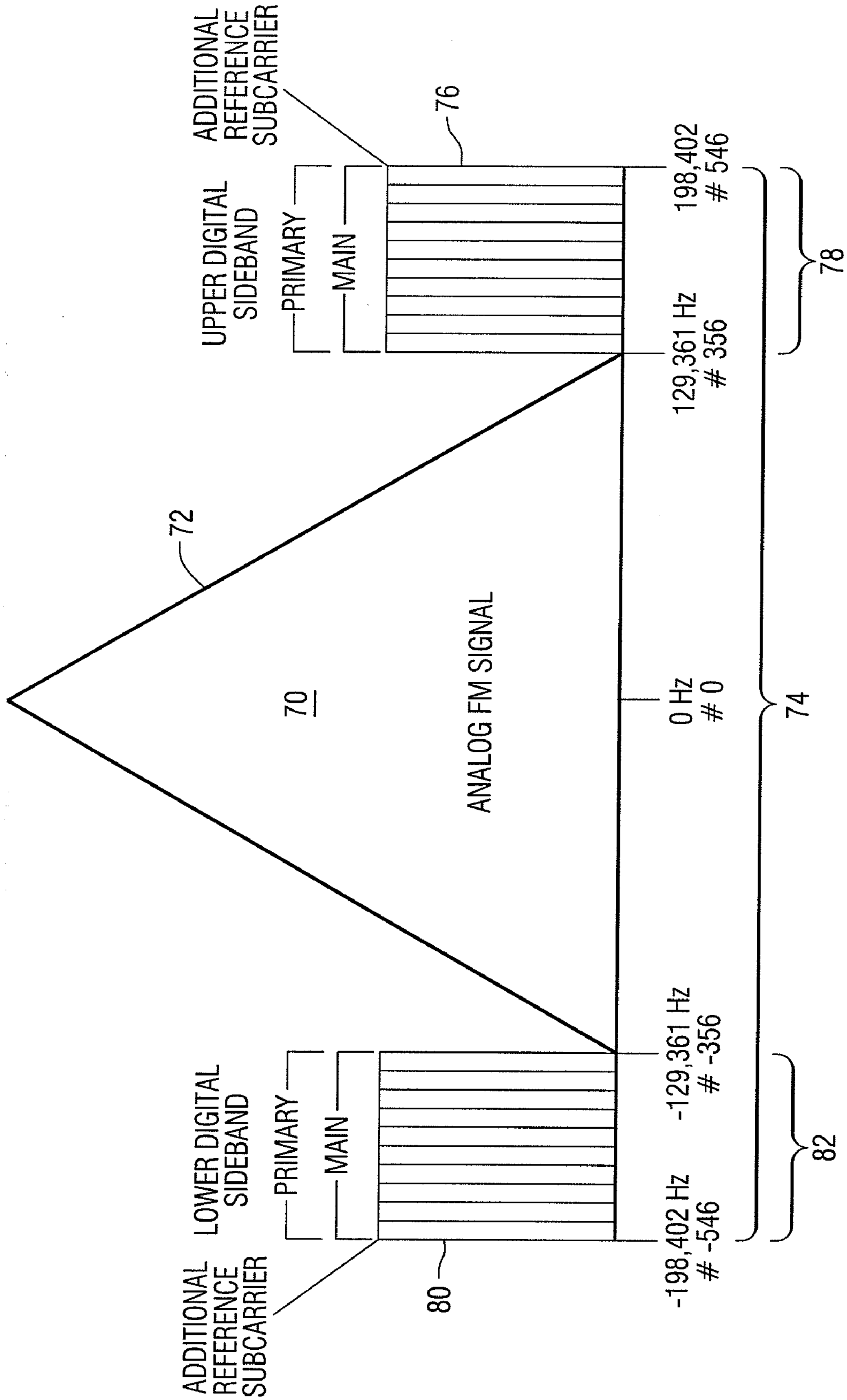
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
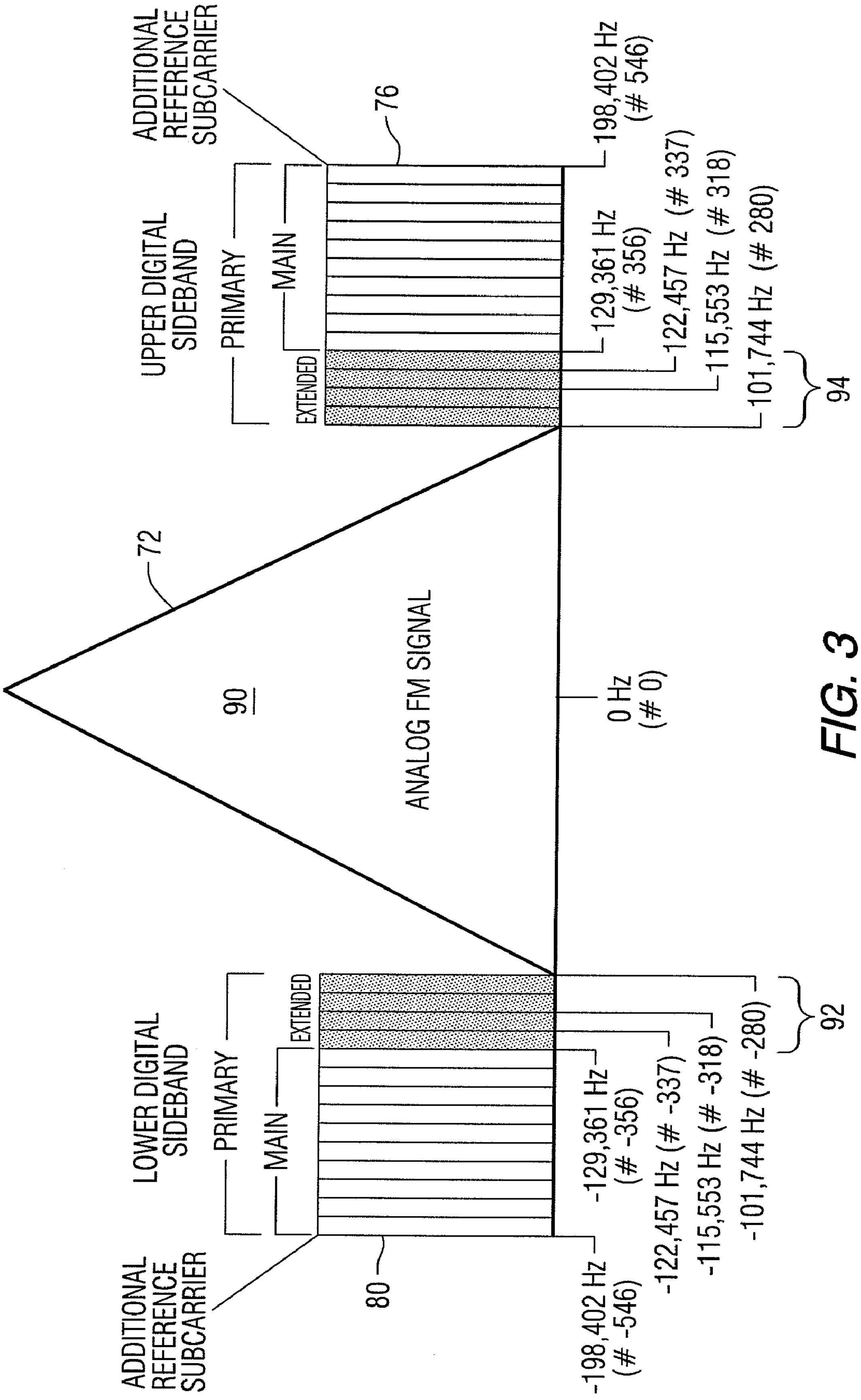
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
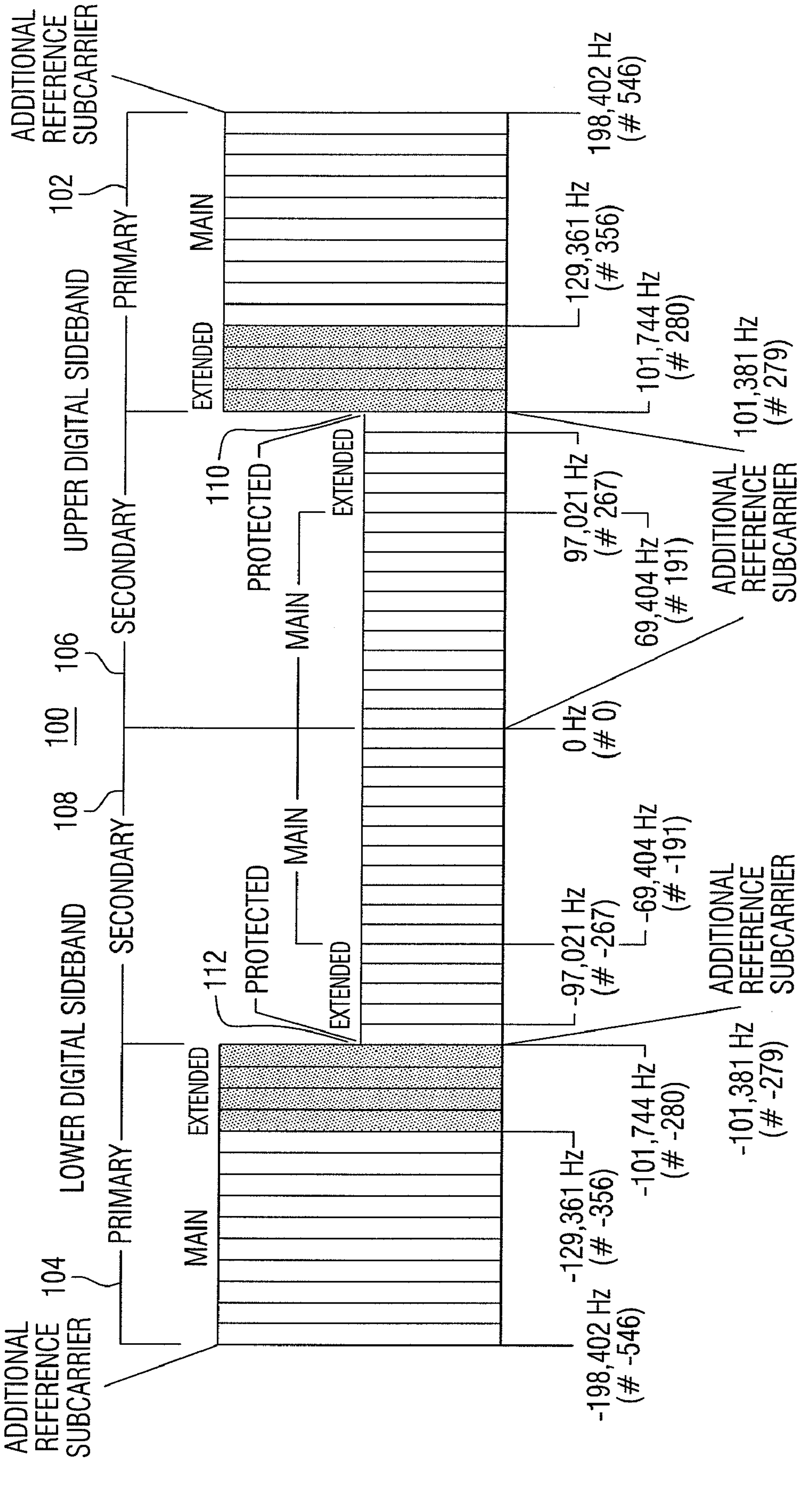
FIG. 4 is a schematic representation of an all-digital FM IBOC waveform.

FIG. 4 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM).

OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

Figure 5:
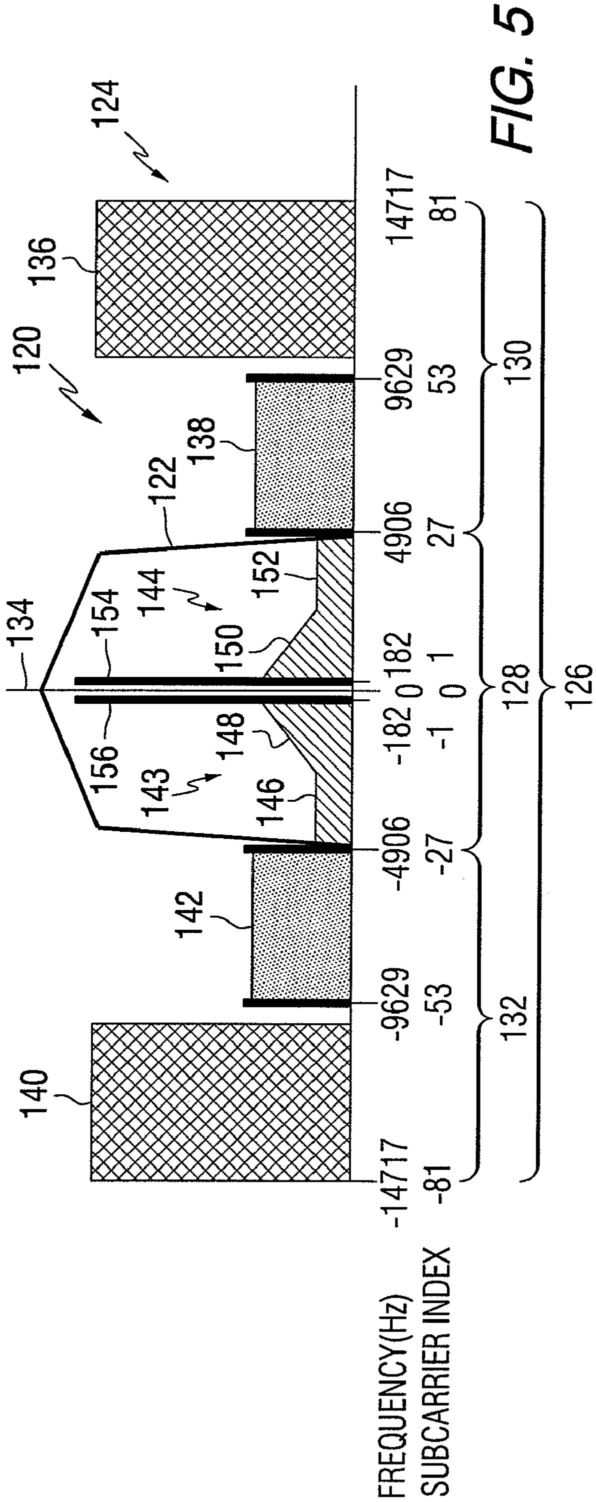
FIG. 5 is a schematic representation of a hybrid AM IBOC DAB waveform.

FIG. 5 is a schematic representation of an AM hybrid IBOC DAB waveform 120. The hybrid format includes the conventional AM analog signal 122 (bandlimited to about ±5 kHz) along with a nearly 30 kHz wide DAB signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

Figure 6:
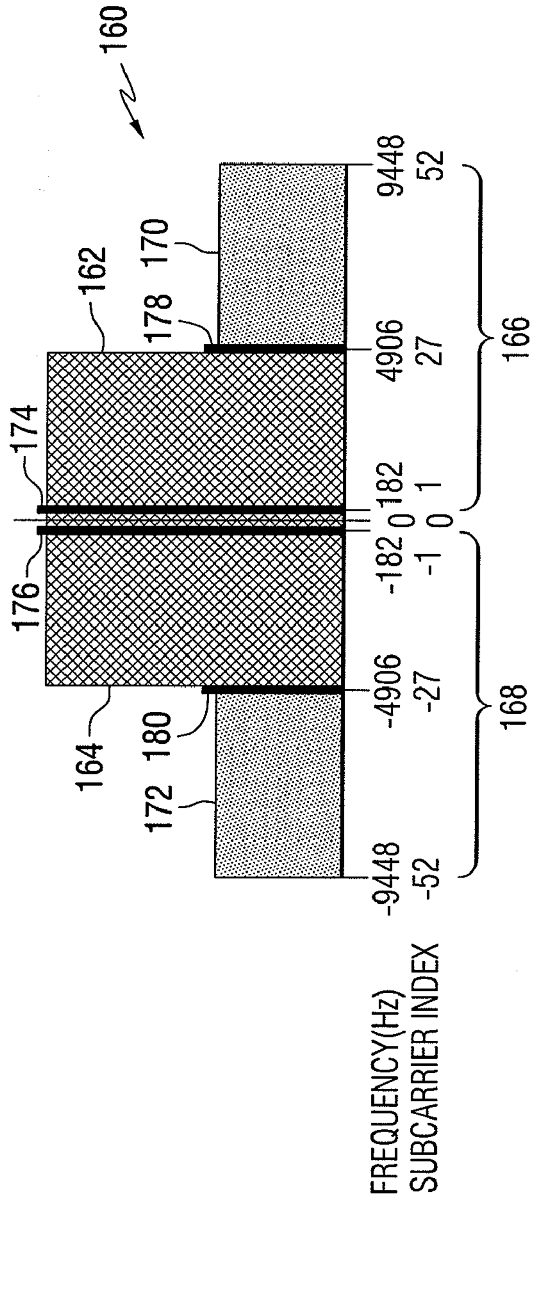
FIG. 6 is a schematic representation of an all-digital AM IBOC DAB waveform.

FIG. 6 is a schematic representation of the subcarrier assignments for an all-digital AM IBOC DAB waveform. The all-digital AM IBOC DAB signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
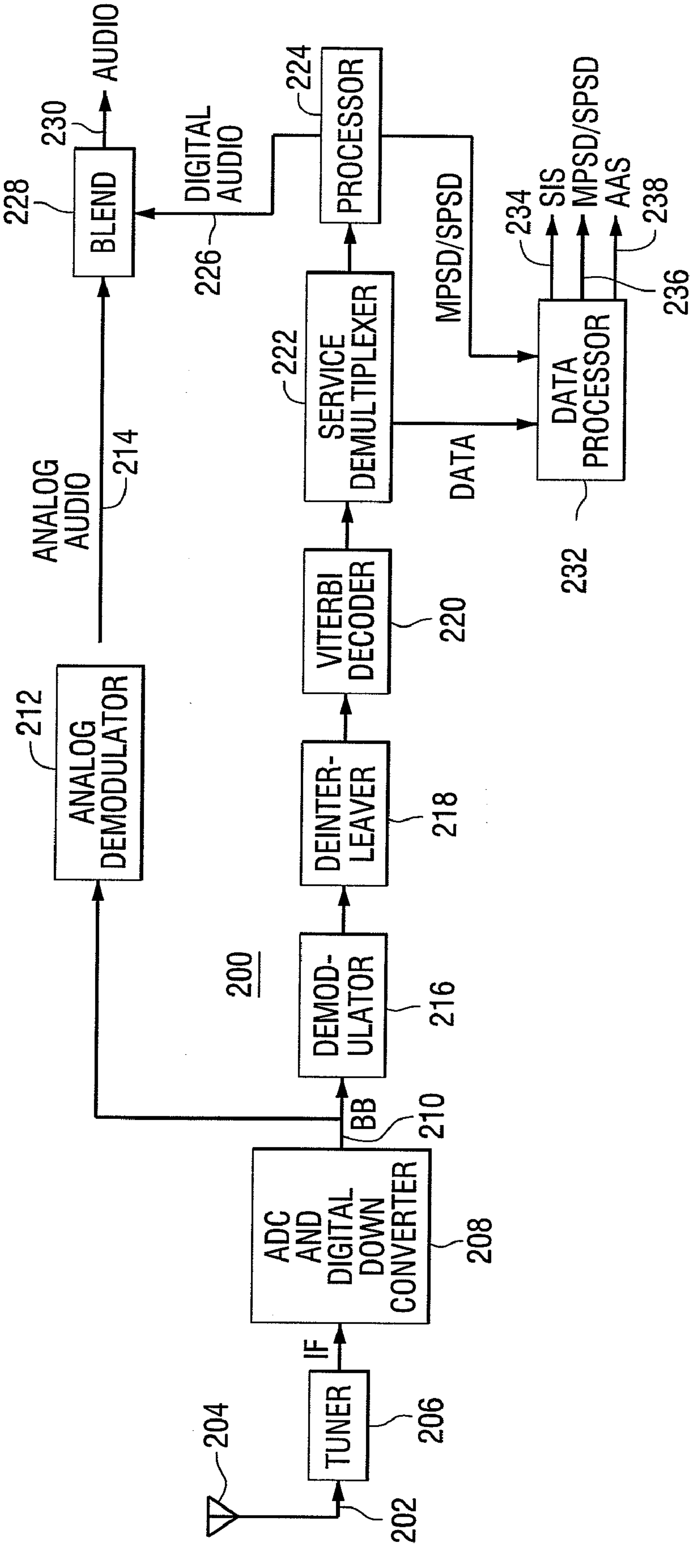
FIG. 7 is a functional block diagram of an AM IBOC DAB receiver.

FIG. 7 is a simplified functional block diagram of an AM IBOC DAB receiver 200. The receiver includes an input 202 connected to an antenna 204, a tuner or front end 206, and a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data signals can include, for example, a station information service (SIS), main program service data (MPSD), supplemental program service data (SPSD), and one or more auxiliary application services (AAS).

Figure 8:
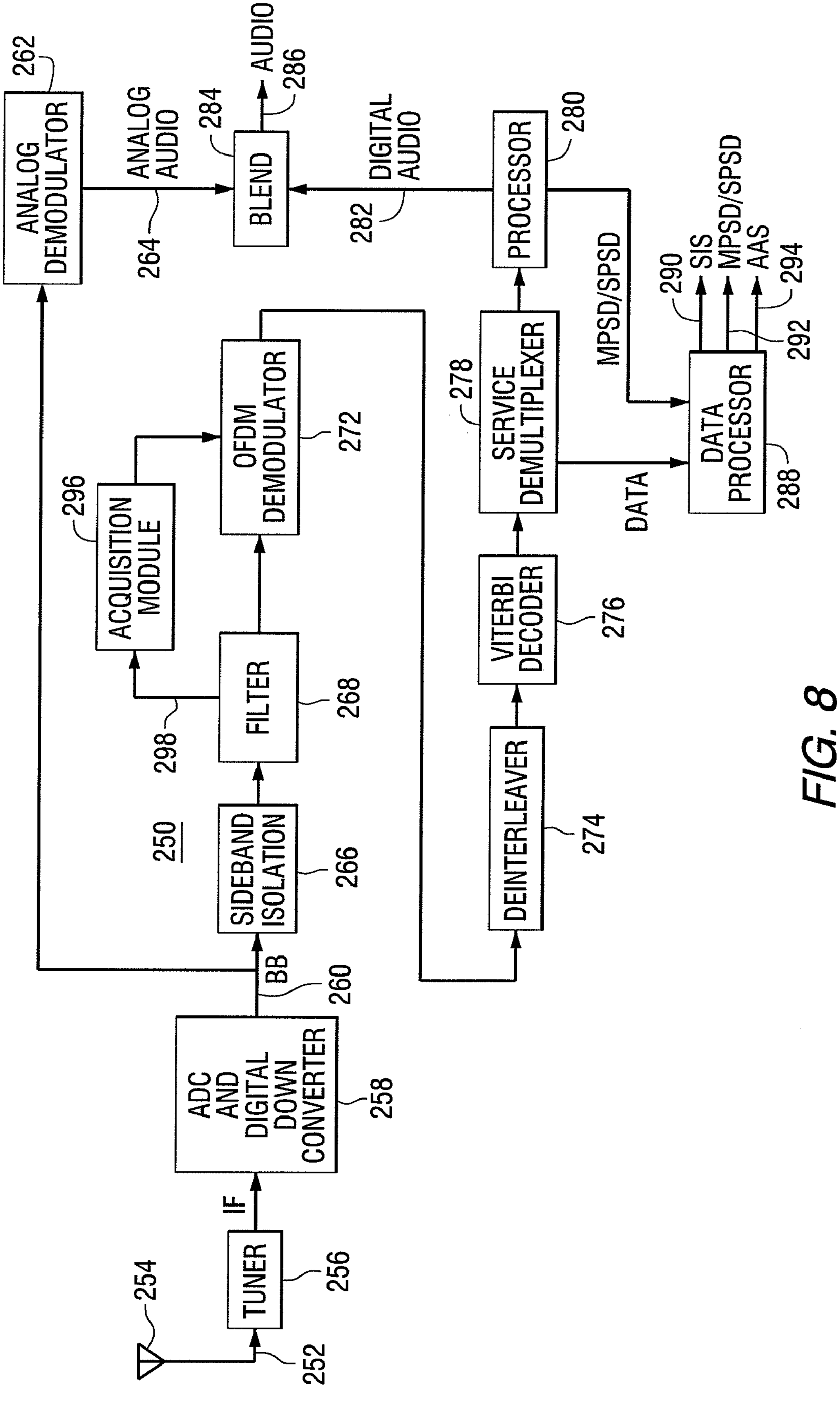
FIG. 8 is a functional block diagram of an FM IBOC DAB receiver.

FIG. 8 is a simplified functional block diagram of an FM IBOC DAB receiver 250. The receiver includes an input 252 connected to an antenna 254 and a tuner or front end 256. A received signal is provided to an analog-to-digital converter and digital down converter 258 to produce a baseband signal at output 260 comprising a series of complex signal samples. The signal samples are complex in that each sample comprises a "real" component and an "imaginary" component, which is sampled in quadrature to the real component. An analog demodulator 262 demodulates the analog modulated portion of the baseband signal to produce an analog audio signal on line 264. The digitally modulated portion of the sampled baseband signal is next filtered by sideband isolation filter 266, which has a pass-band frequency response comprising the collective set of subcarriers $f_1$-$f_n$ present in the received OFDM signal. Filter 268 suppresses the effects of a first-adjacent interferer. Complex signal 298 is routed to the input of acquisition module 296, which acquires or recovers OFDM symbol timing offset or error and carrier frequency offset or error from the received OFDM symbols as represented in received complex signal 298. Acquisition module 296 develops a symbol timing offset Δt and carrier frequency offset Δf, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282. The analog and main digital audio signals are blended as shown in block 284, or the supplemental program signal is passed through, to produce an audio output on line 286. A data processor 288 processes the data signals and produces data output signals on lines 290, 292 and 294. The data signals can include, for example, a station information service (SIS), main program service data (MPSD), supplemental program service data (SPSD), and one or more advanced application services (AAS).

In practice, many of the signal processing functions shown in the receivers of FIGS. 7 and 8 can be implemented using one or more integrated circuits.

Figure 9A:
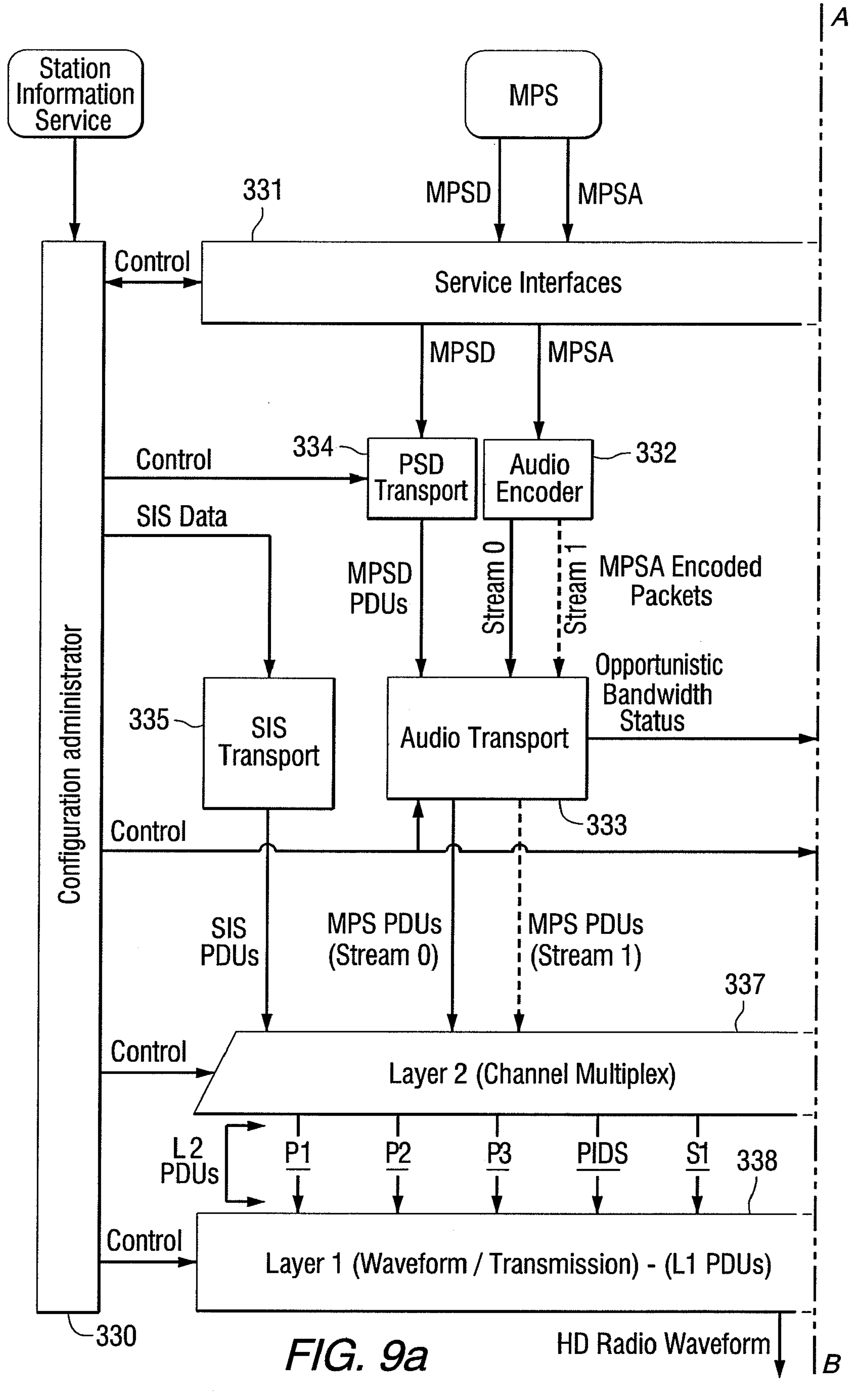
FIGS. 9*a* and 9*b* are diagrams of an IBOC DAB logical protocol stack from the broadcast perspective.
Figure 9B:
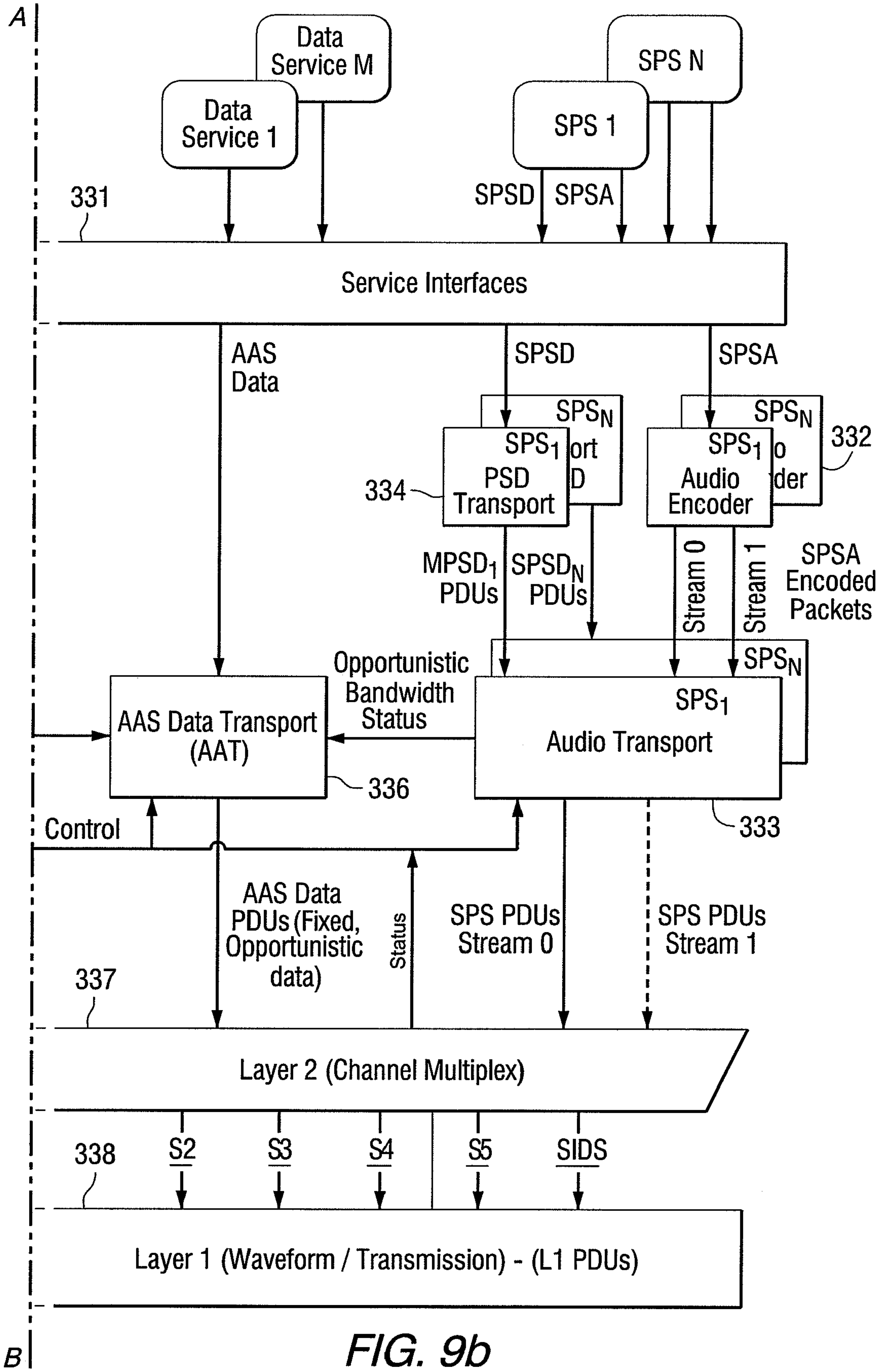

FIGS. 9*a* and 9*b* are diagrams of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9*a* and 9*b*, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services except SIS. The service interface may be different for each of the various types of services. For example, for MPS audio and SPS audio, the service interface may be an audio card. For MPS data and SPS data the interfaces may be in the form of different application program interfaces (APIs). For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, program type, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
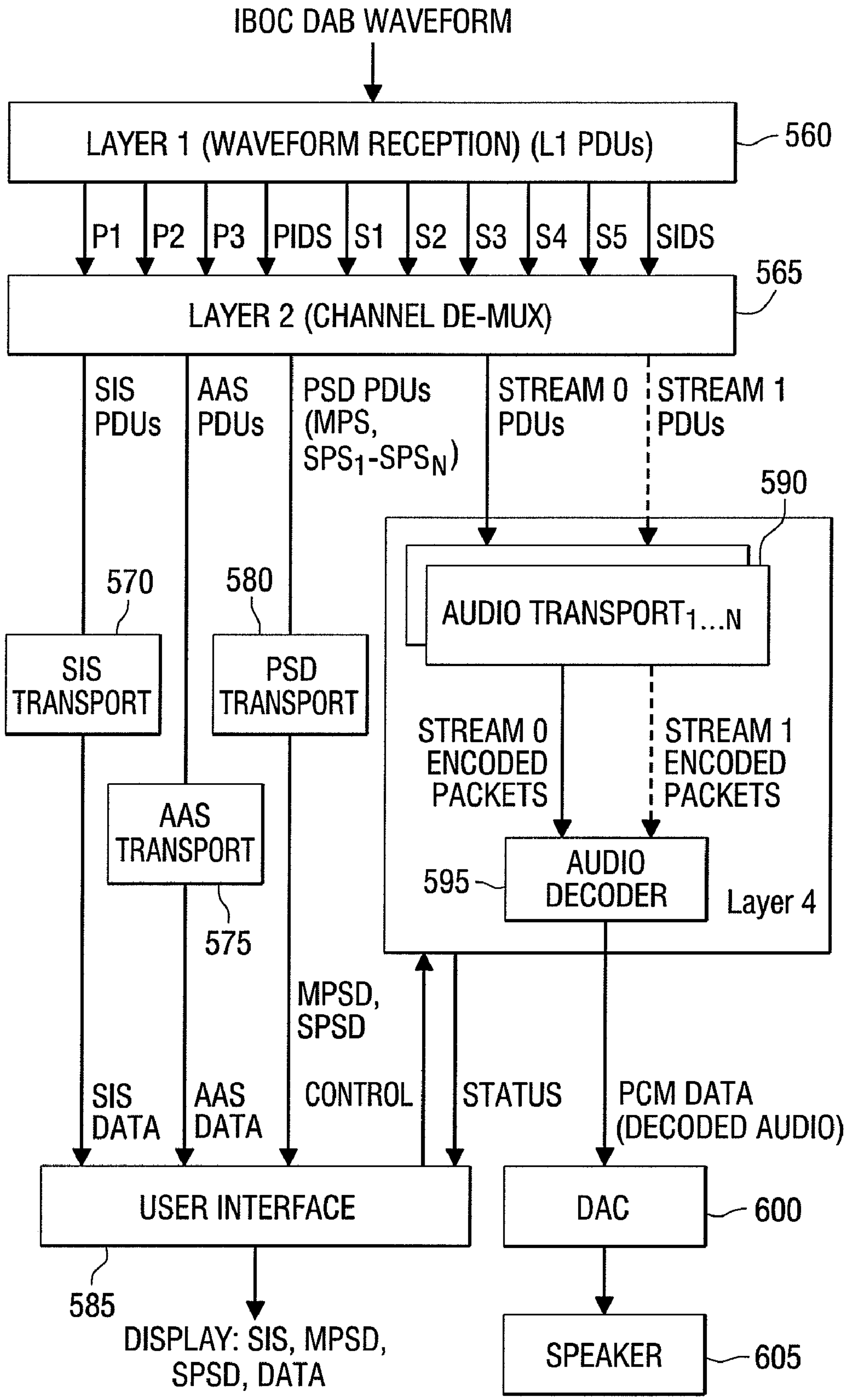
FIG. 10 is a diagram of an IBOC DAB logical protocol stack from the receiver perspective.

FIG. 10 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P3, PIDS, S1-S5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). The SIS data, AAS data, MPSD and SPSD are then sent to a user interface 590. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and to seek or scan for radio stations broadcasting an all-digital or hybrid IBOC signal. Layer 4 also provides status information to the user interface.

Figure 11A:
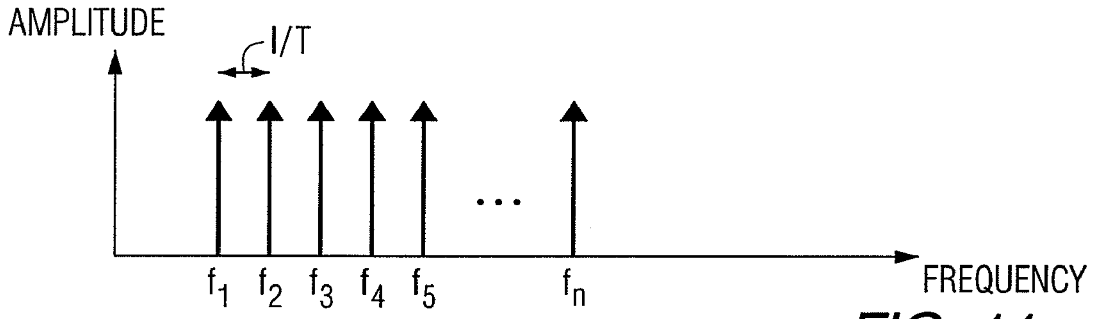
FIG. 11*a* is a graphical representation of an OFDM signal in the frequency domain.

As previously described, the digital portion of an IBOC signal is modulated using orthogonal frequency division multiplexing (OFDM). Referring to FIG. 11*a*, an OFDM signal used in the present invention is characterized as a multi-frequency carrier signal comprising the plurality of equidistantly spaced subcarriers $f_1$-$f_n$. Adjacent subcarriers, such as $f_1$ and $f_2$, are separated each from the other by a predetermined frequency increment such that adjacent subcarriers are orthogonal, each to the other. By orthogonal, it is meant that when properly Nyquist weighted, the subcarriers exhibit no crosstalk. In one hybrid system incorporating the instant invention and using both digital and analog transmission channels, there are 191 carriers in each sideband with a 70 kHz bandwidth for each sideband. In one all-digital implementation of the instant invention there are 267 carriers in each sideband with a 97 kHz bandwidth for each sideband.

Figure 11B:
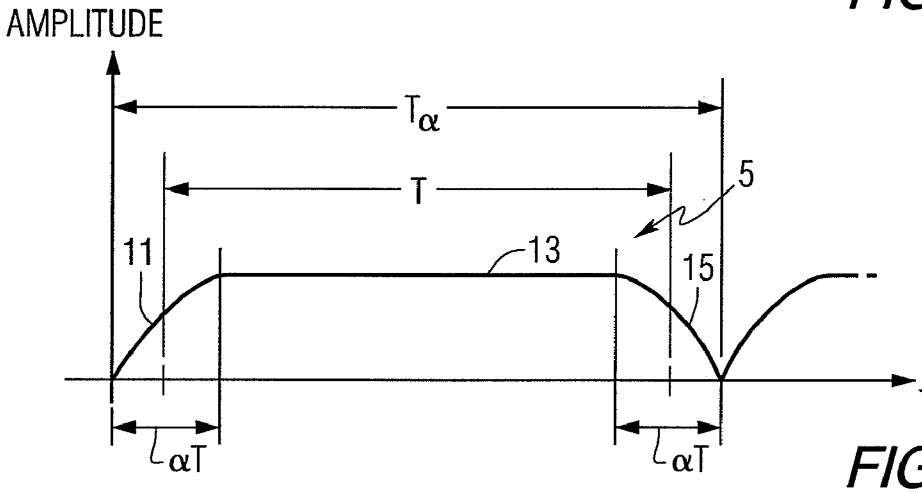
FIG. 11*b* is a graphical representation of the OFDM signal in the time domain.

FIG. 11*b* shows an OFDM symbol 5 in the time domain. The symbol has an effective symbol period or temporal width T, and a full symbol period $T_\alpha$. The OFDM subcarrier orthogonality requirement creates a functional interdependency between the effective symbol period T and the frequency spacing between adjacent OFDM subcarriers. Specifically, the frequency separation between adjacent subcarriers is constrained to be equivalent to the inverse of the effective symbol period T of each OFDM symbol 5. That is, the frequency separation is equal to 1/T. Extending across the effective symbol period T of each OFDM symbol 5 is a predetermined number N of equidistantly spaced temporal symbol samples (not shown in the figure). Further, extending across the full period $T_\alpha$ of each OFDM symbol 5 are a predetermined number $N_\alpha=N(1+\alpha)$ of equidistantly spaced temporal symbol samples. $\alpha$ is the amplitude tapering factor for the symbol, and can be considered here as a fractional multiplier. During modulation, an OFDM modulator generates a series of OFDM symbols 5, each of which comprises a predetermined number of temporal symbol samples $N_\alpha$ corresponding to full symbol period $T_\alpha$, wherein the first $\alpha$N samples and the last $\alpha$N samples of each symbol are tapered and have equal phases. In one embodiment, the predetermined number $N_\alpha$ of temporal samples extending across each full symbol period $T_\alpha$ is 1080, the predetermined number N of temporal samples extending across each effective symbol period T is 1024, and the number of samples in each of the first $\alpha$N samples and last $\alpha$N samples is 56. These values are merely exemplary and may be varied in accordance with system requirements. Also during modulation, a cyclic prefix is applied such that the leading and trailing portions of each transmitted symbol are highly correlated.

Predetermined amplitude-time profile or envelope 11, 15, 13 is imposed upon the signal levels of these samples. This amplitude profile includes symmetrically ascending and descending amplitude tapers 11, 15 at the leading portion and trailing portion of each symbol 5, respectively, and a flat amplitude profile 13 extending therebetween. These rounded or tapered edges provided in the time domain serve to substantially reduce undesirable side-lobe energy in the frequency domain, to thus provide a more spectrally efficient OFDM signal. Although the full symbol period $T_\alpha$ of symbol 5 extends beyond the effective symbol period T, orthogonality between adjacent subcarriers in the frequency domain (FIG. 11*a*) is not compromised so long as amplitude tapers 11, 15 of symbol 5 follow a Nyquist or raised-cosine tapering function. More specifically, orthogonality is maintained in the present invention through a combination of root-raised cosine weighting (or amplitude tapering) of transmitted symbols and root-raised cosine matched filtering of received symbols.

The leading and trailing portions of OFDM symbol 5 share an additional important feature, namely, the first $\alpha$N OFDM symbol samples extending across the leading portion of OFDM symbol 5, which has a temporal duration $\alpha$T, have substantially equivalent phases as the last $\alpha$N symbol samples extending across the trailing portion of OFDM symbol 5, which also has a temporal duration $\alpha$T. Note again that $\alpha$ is the amplitude tapering factor for the symbol, and can be considered here as a fractional multiplier.

Acquisition Module Structure and Operation

Figure 12:
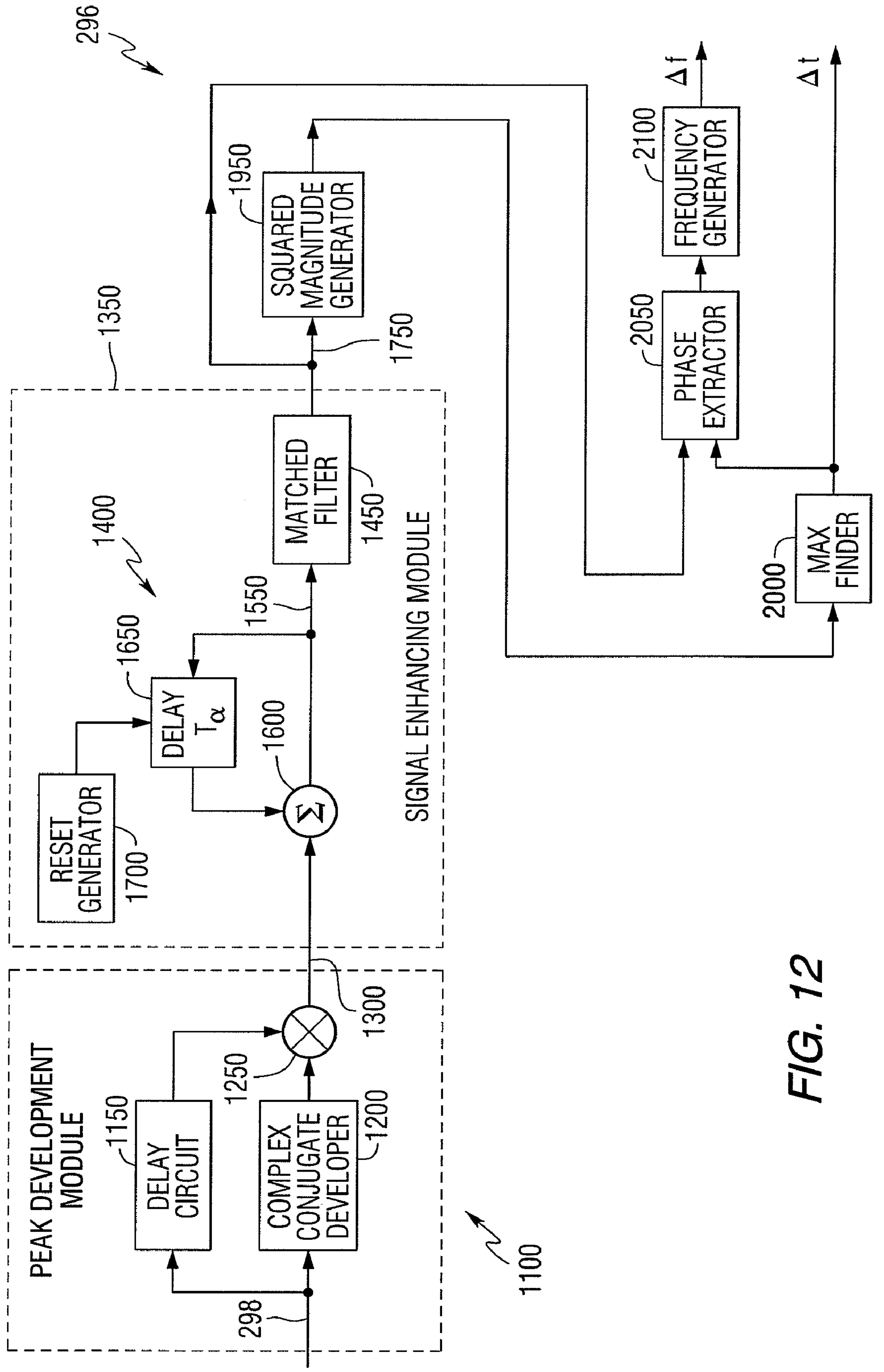
FIG. 12 is a block diagram of one embodiment of an acquisition module.

One embodiment of a basic acquisition module 296, described in U.S. Pat. Nos. 6,539,063 and 6,891,898, is shown in FIG. 12. Received complex signal 298 is provided to the input of peak development module 1100, which provides the first stage of signal processing for acquiring the symbol timing offset of the received OFDM signal. Peak development module 1100 develops a boundary signal 1300 at an output thereof, which has a plurality of signal peaks therein, each signal peak representing a received symbol boundary position for each received OFDM symbol represented in received signal 298, input to peak development module 1100. Because these signal peaks represent received symbol boundary positions, their temporal positions are indicative of received symbol timing offset. More specifically, because the receiver has no initial or a priori knowledge of the true or actual received symbol boundary position, such a position is initially assumed or arbitrarily created to enable receiver processing to operate. Acquisition module 296 establishes the symbol timing offset $\Delta t$ that exists between this a priori assumption and the true, received symbol boundary position, thus enabling the receiver to recover and track symbol timing.

In developing the signal peaks representing OFDM symbol boundaries, peak development module 1100 exploits the cyclic prefix applied by the transmitter, as well as the predetermined amplitude tapering and phase properties inherent in the leading and trailing portions of each received OFDM symbol. Particularly, complex conjugate products are formed between the current sample and the sample preceding it by N samples. Such products, formed between the first $\alpha$N samples and the last $\alpha$N samples in each symbol, produce a signal peak corresponding to each symbol comprising the $\alpha$N conjugate products so formed.

Mathematically, the formation of the conjugate products is represented as follows. Let D(t) denote the received OFDM signal, and let $T_\alpha=(1+\alpha)T$ denote the full OFDM symbol duration or period where 1/T is the OFDM channel spacing and $\alpha$ is the amplitude tapering factor for the symbol. The signal peaks in boundary signal 1300 appear as a train of pulses or signal peaks in the conjugate products of $D(t)\cdot D^*(t-T)$. As a result of the Nyquist amplitude tapering imposed on the leading and trailing portions of each OFDM symbol, each of the pulses or signal peaks has a half-sine-wave amplitude profile of the form $$w(t)=\{\tfrac{1}{2}\sin(\pi t/(\alpha T)),\ \text{for } 0\leqq t\leqq\alpha T, \text{ and}$$

$$w(t)=\{0,\ \text{otherwise}.$$

Figure 11C:
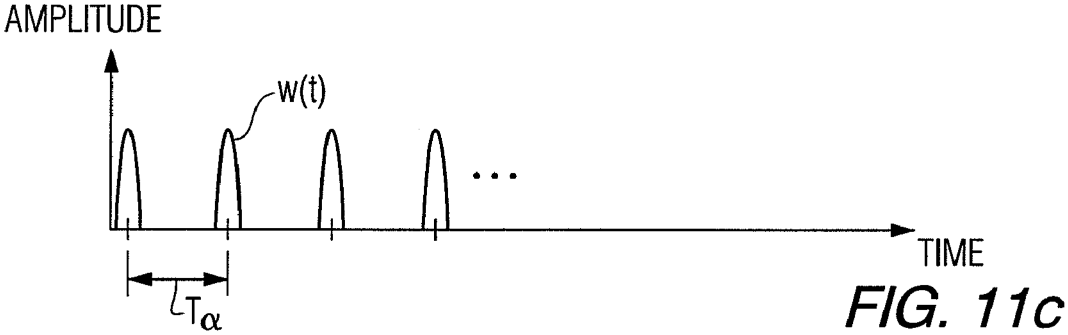
FIG. 11*c* is a graphical representation of the conjugate product signal peaks representing symbol boundaries.
Figure 11D:
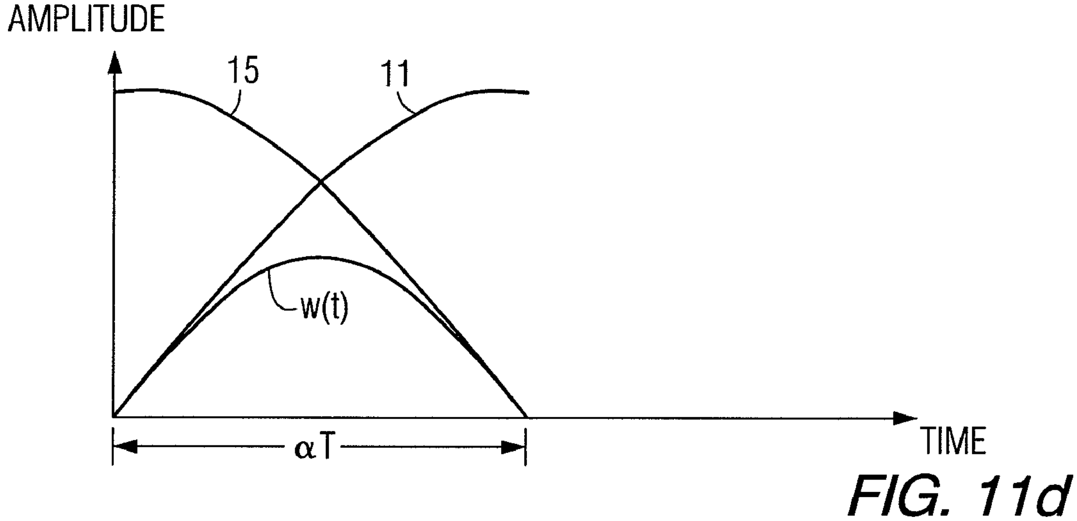
FIG. 11*d* is a graphical illustration of the conjugate products multiplied by respective amplitude tapers.

Further, the periodicity of signal 1300, that is, the period of the train of signal peaks, is $T_\alpha$. Referring to FIG. 11*c*, the train of signal peaks included in boundary signal 1300 has amplitude envelope w(t) and the peaks are spaced by a period of $T_\alpha$. Referring to FIG. 11*d*, the product of the overlapping leading and trailing portion amplitude tapers 11, 15 multiplies the squared magnitudes in the conjugate products, resulting in the half-sine-wave, w(t) which has a durational width $\alpha$T corresponding to $\alpha$N samples.

Returning again to FIG. 12, for each signal sample input to peak development module 1100, one product sample is output from multiplier circuit 1250 representing a conjugate product between that input sample and a predecessor sample, spaced T samples therefrom. Complex conjugate developer 1200 produces at its output the complex conjugate of each input sample, which output is provided as one input to multiplier 1250. The conjugate samples at this output are multiplied against the delayed sample output from delay circuit 1150. In this way, complex conjugate products are formed between the received signal 298 and a delayed replica thereof obtained by delaying the received signal 298 by the predetermined time T using delay circuit 1150.

Figure 13A:
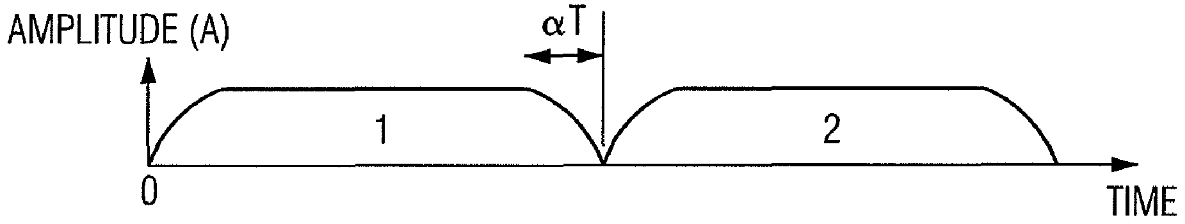
FIGS. 13*a*, 13*b*, and 13*c* are graphical representations of symbol timing for a peak development module.
Figure 13B:
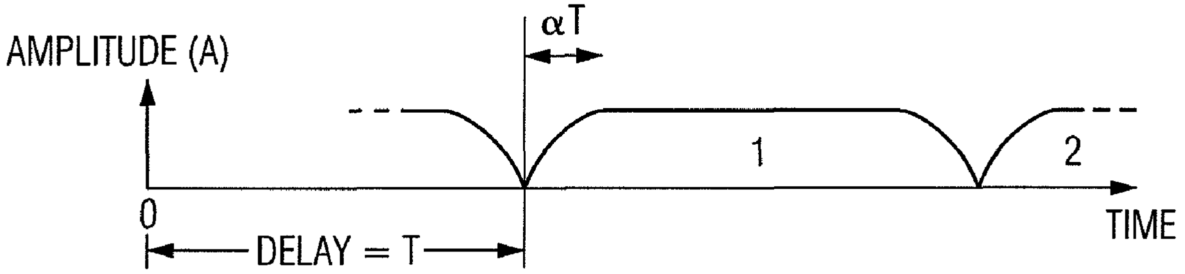
Figure 13C:
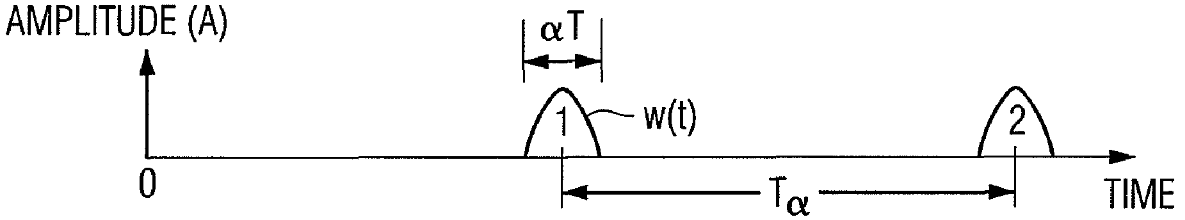

Referring to FIGS. 13*a*, 13*b*, and 13*c*, the relevant symbol timing for peak development module 1100 is illustrated. FIG. 13*a* represents consecutive OFDM symbols 1 and 2 provided at the input to peak development module 1100. FIG. 13*b* illustrates the delayed versions of OFDM symbols 1 and 2 as output from delay circuit 1150. FIG. 13*c* represents the signal peak developed for each corresponding set of N=N(1+α) product samples (which in one working embodiment equals 1080 samples), the train of signal peaks being produced responsive to the conjugate multiplication between the received signal of FIG. 13*a* and the delayed version thereof in FIG. 13*b*.

By way of specific example, if the received OFDM symbol period $T_\alpha$ corresponds to $N_\alpha$=1080 signal samples, and the αN samples at each of the leading and trailing portions of the symbol correspond to 56 signal samples, then for each 1080-sample OFDM symbol input to peak development module 1100, there appears a corresponding set of 1080 product samples in boundary signal 1300. In this example, delay circuit 1150 imparts a 1024-(N) sample delay so that each sample input to multiplier 1250 is multiplied by its predecessor 1024 samples away. The signal peak so developed for each corresponding set of 1080 product samples comprises only 56 conjugate products formed between the first and last 56 samples of each corresponding symbol.

Peak development module 1100 can be implemented in any number of ways as long as the correspondence between the leading and trailing portions of each symbol is exploited in the manner previously described. For instance, peak development module 1100 may operate on each sample as it arrives, so that for each sample in, a product sample is provided at the output thereof. Alternatively, a plurality of samples may be stored, such as in vector form, thus creating present sample vectors and delayed sample vectors, which vectors can be input to a vector multiplier to form vector product samples at an output thereof. Alternatively, the peak development module can be implemented to operate on continuous rather than sampled discrete time signals. However, in such an approach, it would be desirable that input received signal 298 also be a continuous rather than a sampled signal.

Ideally, boundary signal 1300 has easily identifiable signal peaks therein, as illustrated in FIGS. 11*c* and 13*c*. However, in reality, each signal peak is virtually indistinguishable from the undesired noisy products of samples lying in adjacent symbols. Since peak development module 1100 continually forms products between samples extending across each received symbol and predecessor samples delayed therefrom, boundary signal 1300 includes both desired signal peaks as well as the noisy conjugate products. For example, the first αN (56) samples in each symbol are multiplied against the last αN samples therein, to produce the desired signal peak αN samples in duration. However, the remaining N (1024) samples are multiplied against N samples from the adjacent symbol responsive to the delay imparted thereto by delay circuit 1150 (see FIG. 13). These additional unwanted products have the effect of filling in noise between the occurrences of the desired signal peaks. Thus, noisy products corresponding to OFDM signals can be appreciable.

In addition to the presence of the aforementioned product noise in boundary signal 1300, there is noise derived from other sources well known in the art of digital communications. Such noise is imparted to the signal during propagation thereof through the atmosphere by ambient noise, scattering, multipath and fading, and signal interferences. The front end of the receiver also adds noise to the signal.

Subsequent signal processing stages are dedicated, in part, to combating the depreciating effect of the aforementioned noise with respect to the desired signal peaks in boundary signal 1300, or more specifically, to improve the signal-to-noise ratio of the signal peaks present in boundary signal 1300. Signal enhancing module 1350 is provided at the output of peak development module 1100, and comprises first and second stage signal enhancing circuits or modules. The first stage signal enhancing circuit is an additive superposition circuit or module 1400 and the second stage enhancing circuit is a matched filter 1450, provided at the output of the first stage enhancing circuit.

Additive superposition circuit 1400 additively superimposes a predetermined number of signal peaks and their surrounding noisy products, to enhance signal peak detectability by increasing the signal-to-noise ratio of the signal peaks in boundary signal 1300. To implement this process of additive superposition, a predetermined number of consecutive segments of boundary signal 1300 are first superimposed or overlapped in time. Each of these superimposed segments comprises a symbol period's worth of conjugate product samples as are output from peak development module 1100, and includes a desired signal peak surrounded by undesired noisy product samples.

After the predetermined number or block of signal segments have been time overlapped, the product samples occupying a predetermined temporal position in the superimposed set of segments are accumulated to form a cumulative signal sample for that predetermined position. In this way, a cumulative signal is developed comprising a cumulative signal sample for each of the predetermined sample positions extending across the superimposed boundary signal segments.

If, for example, 32 contiguous boundary signal segments are to be superimposed, and if each segment includes a symbol period's worth of 1080 samples, then additive superposition circuit 1400 produces 1080 cumulative samples for each contiguous block of 32 segments (1080 samples per segment) input thereto. In this manner, the conjugate products of 32 segments (each segment including 1080 samples, a signal peak and noise therein) are additively superimposed or "folded" on top of one another, by pointwise adding the superimposed conjugate products of the 32 segments. Essentially, in this folding process, the products of the 32 segments are pointwise added to corresponding conjugate products one symbol period (or 1080 samples) away, over the 32 contiguous symbols, to produce a cumulative signal segment comprising 1080 cumulative samples therein. The signal processing is then repeated for the next contiguous block of 32 boundary signal segments, to produce another cumulative signal segment, and so on.

The cumulative signal segment produced by additively superimposing the predetermined number of contiguous segments of boundary signal 1300 includes an enhanced signal peak therein, which exhibits an increased signal-to-noise ratio with respect to the signal peaks in each of the constituent input boundary signal segments. The reason for this enhancement is that the superposition of the boundary signal segments aligns their respective signal peaks, so that when the segments are accumulated, each signal peak adds to the next, thus achieving a form of coherent processing gain based upon the repetitive nature of the boundary signal peaks.

Whereas the aligned, repetitive signal peaks in the boundary signal segments coherently accumulate to form an enhanced (cumulative) signal peak at the output of the additive superposition module 1400, by contrast, the random nature of the noisy conjugate products surrounding the signal peak in each of the boundary signal segments produce incoherent addition thereof during the additive superposition process. Because the signal peaks add coherently and the surrounding noisy products having zero mean add incoherently and are thus averaged, the enhanced signal peak output from the additive superposition module 1400 exhibits, overall, an improved signal-to-noise ratio. The processing gain and signal-to-noise ratio enhancement achieved by the additive superposition module increases along with the number of boundary signal segments superimposed to produce the cumulative signal segment. Offsetting this advantage is a corresponding disadvantageous increase in acquisition delay, since more boundary signal segments are collected to produce the cumulative signal peak. Thus, the particular predetermined number, for instance 16 or 32, represents in any application a balancing between these two competing interests, wherein the number of averages is ultimately limited by the fading bandwidth.

In mathematical terms, the additive superposition of contiguous segments of the conjugate products present in boundary signal 1300 can be expressed by the following:

$$F(t) = \sum_{k=0}^{K-1} D(t + kT_\alpha) \cdot D^*(t - T + kT_\alpha)$$

where k is the number of superimposed segments, D is input 298 to the peak development module 1100, and K is the number of segments, such as 16, for example. An important aspect of the foregoing signal processing is that symbol timing is preserved at each stage thereof: OFDM symbols input to peak development module 1100, boundary signal segments input to additive superposition circuit 1400, and cumulative signal segments output therefrom, each have a temporal period of $T_\alpha$ (corresponding to N=1080 samples). In this way, symbol timing offset, as indicated by the positioning of the signal peaks within a signal segment, is preserved throughout.

In operation, the additive superposition module 1400, summation module 1600 and feedback delay module 1650, together provide the additive superposition functions. That is, summation module 1600 adds a present input sample to the result of an accumulation of samples in contiguous symbols, each of the samples being temporally spaced by one symbol period $T_\alpha$ (corresponding to 1080 samples). Delay 1650 imparts the one symbol period delay between accumulations. Stated otherwise, each accumulated result output by summation module 1600 is delayed by 1 symbol period $T_\alpha$, and then fed back as an input to summation module 1600, where it is added to the next input sample. The process repeats for all input samples across each input symbol.

Stated otherwise, the first cumulative sample in the cumulative signal segment represents an accumulation of all of the first samples of all of the 32 boundary signal segments. The second cumulative sample represents an accumulation of all of the second samples of all of the 32 boundary signal segments, and so on, across the cumulative signal segment.

Reset generator 1700 provides a reset signal to delay module 1650 after the predetermined number of signal segments has been accumulated to produce the cumulative signal segment. For example, if the predetermined number of boundary signal segments to be accumulated is 32, the reset generator 1700 asserts a reset to feedback delay module 1650 every 32 signal segments. Responsive to assertion of the reset, additive superposition module 1400 accumulates the next predetermined number of contiguous boundary signal segments.

As previously described, the output of additive superposition module 1400 is a cumulative signal comprising a series of cumulative signal segments, each segment including an enhanced signal peak 1550 therein. In a high-noise environment, enhanced signal peak 1550, although exhibiting an improved signal-to-noise ratio, can still be virtually indistinguishable from the surrounding noise. Thus, it is desirable to further enhance the signal-to-noise ratio of the enhanced signal peak.

To further enhance the signal-to-noise ratio of enhanced signal peak 1550, the cumulative signal output from additive superposition module 1400 is input to matched filter 1450. The temporal impulse response of matched filter 1450 is matched to the shape or amplitude envelope of the enhanced signal peak input thereto, and in one embodiment of the present invention, follows a root-raised cosine profile. Specifically, the impulse response of the matched filter corresponds to the function w(t), as shown in FIG. 11*d*, and is determined by pointwise multiplying the first αN samples of symbol 5 with the last αN samples thereof. See FIGS. 11*b* and 11*d*.

Although a non-matched low-pass filter could be used to smooth the noise present in the cumulative signal, the matched filter 1450 provides the optimum signal-to-noise improvement for the desired signal, enhanced signal peak 1550, in a Gaussian noise environment. Matched filter 1450 is implemented as a finite impulse response (FIR) digital filter that provides at an output thereof a filtered version of the complex samples input thereto.

Briefly summarizing the signal processing stages leading up to the output of the matched filter, peak development module 1100 produces a plurality of signal peaks, the temporal positions of which represent symbol boundary positions which represent symbol timing offset for each received OFDM symbol. Signal enhancing module 1350 enhances the detectability of the signal peaks by first additively superimposing a predetermined number of input signal segments to produce a cumulative signal segment having an enhanced peak therein, and then second, matched filtering the cumulative signal segment to produce a cumulative, matched-filtered signal segment that is optimally ready for subsequent peak detection processing. This process continually operates to produce a plurality of filtered enhanced signal peaks at the output of signal enhancing module 1350. The temporal positions of these filtered enhanced signal peaks within the match-filtered, cumulative signal segments output from signal enhancing module 1350, are indicative of symbol boundary positions or OFDM symbol timing offset.

Taken individually, and especially in combination, the additive superposition module and matched filter advantageously enhance signal peak detectability. Their introduction subsequent to the peak development stage permits the effective use of an OFDM signal comprising a large number of frequency carriers, and operating in a propagationally noisy signal environment.

The next stage of signal processing required to establish symbol timing offset is to detect the temporal position of the signal peak output from signal enhancing module 1350. The temporal position of the signal peak is, in actuality, the sample index, or sample number, of the enhanced signal peak within the filtered, cumulative signal segment output from the matched filter.

Filtered complex signal 1750 output from matched filter 1450 is provided as an input to peak selector module 1900, which detects the enhanced filtered signal peak and the temporal position, or sample index, thereof. In operation, squared magnitude generator 1950 of peak selector 1900 squares the magnitude of the complex signal samples input thereto to generate a signal waveform at the output thereof. The output of squared magnitude generator 1950 is provided as an input to max finder 2000 which examines the sample magnitudes input thereto and identifies the temporal position or sample index corresponding to the signal peak.

This temporal position of the signal peak is provided, essentially, as the symbol timing offset that is provided by acquisition module 296 to an input of a symbol timing correction module (not shown). It should be appreciated that the temporal position provided as the timing offset Δt may require slight adjustments to compensate for various processing delays introduced by the preceding signal processing stages. For example, initialization delays in loading filters, etc., can add delays that need to be calibrated out of the final timing offset estimate. However, such delays are generally small and implementation specific.

After the temporal position of the signal peak has been determined (to establish symbol timing offset), the next stage in signal processing is to determine the carrier phase error and corresponding carrier frequency error of the received OFDM signal. The matched-filtered, enhanced signal peak in complex signal 1750 represents the cleanest point, or point of maximum signal-to-noise ratio, at which to determine the carrier phase error and frequency error. The phase of the complex sample at this peak position gives an indication of the frequency error existing between the transmitter and receiver, since the conjugate product at this point, as developed by peak development module 1100, should have yielded a zero-phase value in the absence of carrier frequency error. The conjugate product at this point of the signal peak, and in fact at every other point in the signal peak, should yield a zero-phase value because, mathematically, the conjugate product between symbol samples having equivalent phase (as do the samples at the leading and trailing portions of each received symbol) eliminates phase, in the absence of carrier frequency error. Any residual phase present at the peak of the signal output from the matched filter is proportional to carrier frequency error, and the frequency error is simple to calculate once the residual phase is determined.

Mathematically, the carrier frequency error Δf produces the residual phase shift of 2πΔfT between the samples at the leading and trailing portions of an OFDM symbol that form a conjugate product peak. Thus, the frequency error is represented by the following equation:

$$\Delta f = \frac{\text{Arg}(G_{\text{Max}})}{2\pi T}$$

where $G_{Max}$ is the peak of the matched filter output and Arg denotes the argument (phase) of a complex number—the complex sample—at the signal peak. The Arg function is equivalent to the four quadrant arctangent. Since the arctangent cannot detect angles outside of a 2π window, the frequency estimate is ambiguous up to a multiple of the channel spacing, 1/T. Nevertheless, this frequency error estimate, together with the timing offset estimate provided by the location of the signal peak, is sufficient to allow the commencement of symbol demodulation. As demodulation proceeds, subsequent receiver frame boundary processing, not part of the present invention, resolves the frequency ambiguity.

In FIG. 12, both the matched-filtered, complex signal 1750 and the temporal position or sample index, are provided as inputs to phase extractor 2050. Phase extractor 2050 extracts the residual phase from the complex sample representing the enhanced signal peak output from the matched filter. The extracted phase is provided to the input of frequency generator 2100 which simply scales the extracted phase input thereto to produce the carrier frequency error Δf which is then provided by acquisition module 296 to a frequency correction module (not shown). Thus, the temporal position of the filtered signal peak provided at the output of matched filter 1450 is indicative of symbol timing offset, and from the phase of this signal peak, carrier frequency error is derived.

FM Digital Seek-Scan Function

The foregoing method and apparatus for acquiring or recovering symbol timing offset and carrier frequency error from a received OFDM signal provide a basic technique for determining unqualified symbol timing offset and carrier frequency error. U.S. Pat. Nos. 6,539,063 and 6,891,898 describe additional techniques for acquiring or recovering symbol timing offset and carrier frequency error from a received OFDM signal, any of which may be used in an implementation of the present invention for FM seek and scan functions. Because the acquisition function as described in these patents is a time-domain process that occurs near the start of the baseband processing chain and before OFDM demodulation, it can be exploited to provide an effective seek-scan metric. This relatively early processing makes acquisition an ideal candidate for providing an effective seek-scan metric, because it is advantageous that the band-scanning duration be minimized.

Moreover, the predetermined amplitude and phase properties described above and inherent in the leading and trailing portions of the OFDM symbol, namely, the tapering of sample amplitudes in the leading and trailing portions of each OFDM symbol and the equivalent phases thereof, are advantageously exploited by existing IBOC systems in order to efficiently acquire OFDM symbol timing and frequency in the receiver. These properties can be used according to the present invention for implementing a seek-scan function. Thus, in one aspect, this invention utilizes these symbol characteristics to provide FM seek and scan functions using a previously existing FM acquisition module to generate an appropriate metric for determining whether a station is broadcasting a digital signal.

Preferably, the acquisition algorithm used for the seek-scan metric is comprised of two operations: pre-acquisition filtering and acquisition processing. Pre-acquisition filtering is used to prevent falsely acquiring on large second-adjacent channels. Each primary sideband is filtered prior to acquisition processing. In one example, the pre-acquisition filter is an 85-tap finite impulse response (FIR) filter, designed to provide 40 dB stopband rejection while limiting the impact on the desired primary sideband. Existing pre-acquisition filters can be completely reused, without modification, when calculating the seek-scan metric of this invention. After the input samples have been filtered, they are passed to the acquisition processing functional component.

The acquisition processing functional component takes advantage of correlation within the symbol resulting from the cycle prefix applied to each symbol by the transmitter to construct acquisition peaks. As previously described, the position of the peaks indicates the location of the true symbol boundary within the input samples, while the phase of the peaks is used to derive the frequency error. Moreover, frequency diversity can be achieved by independently processing the upper and lower primary sidebands of the digital radio signal.

Each of the symbols includes a plurality of samples. The inputs to acquisition processing are blocks of upper and lower primary sideband samples. In one example, each block is comprised of 940 real or imaginary samples, at a rate of 372,093.75 samples per second.

Figure 14:
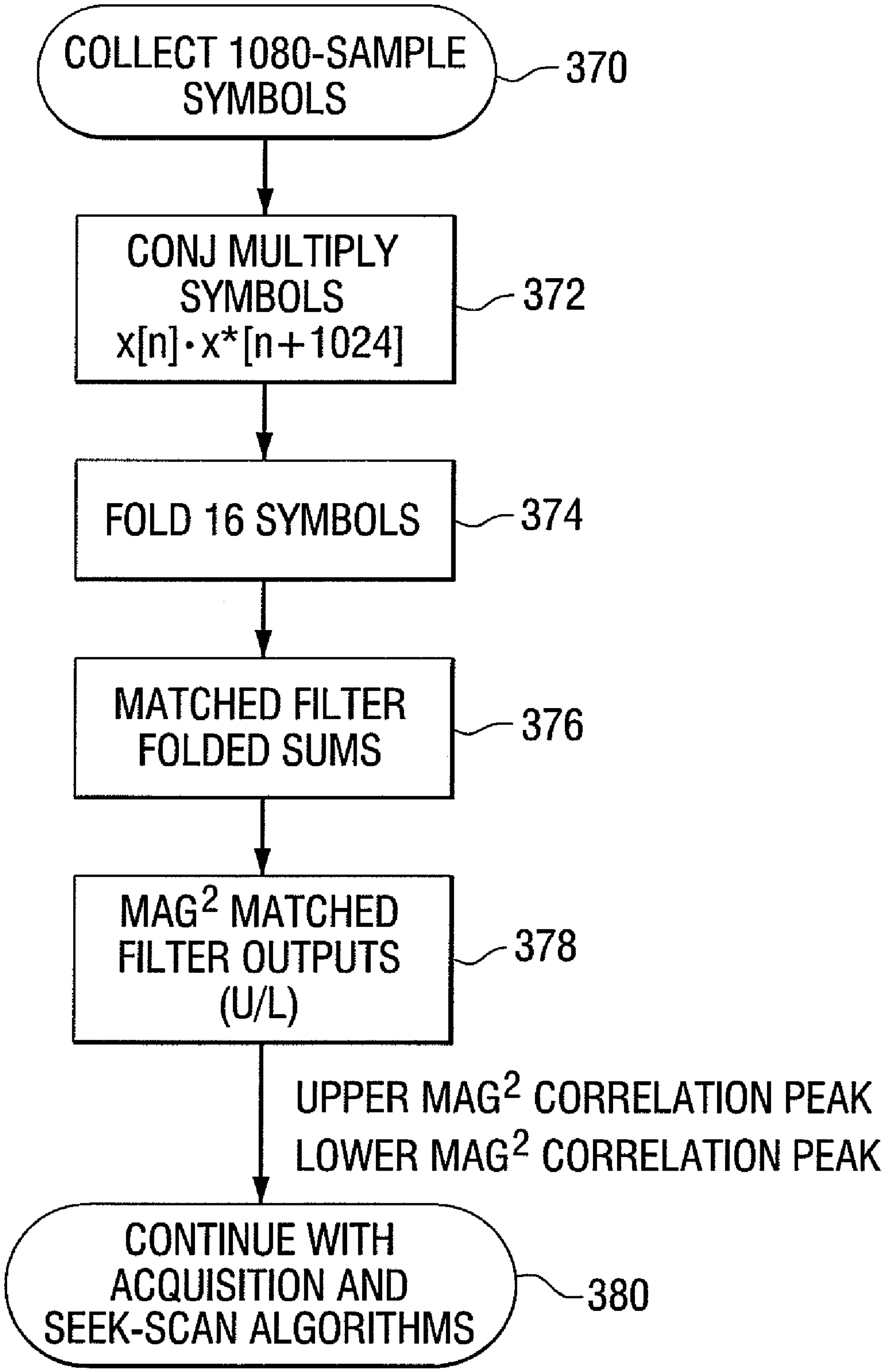
FIG. 14 is a flow diagram of a first portion of signal acquisition processing.
Figure 19:
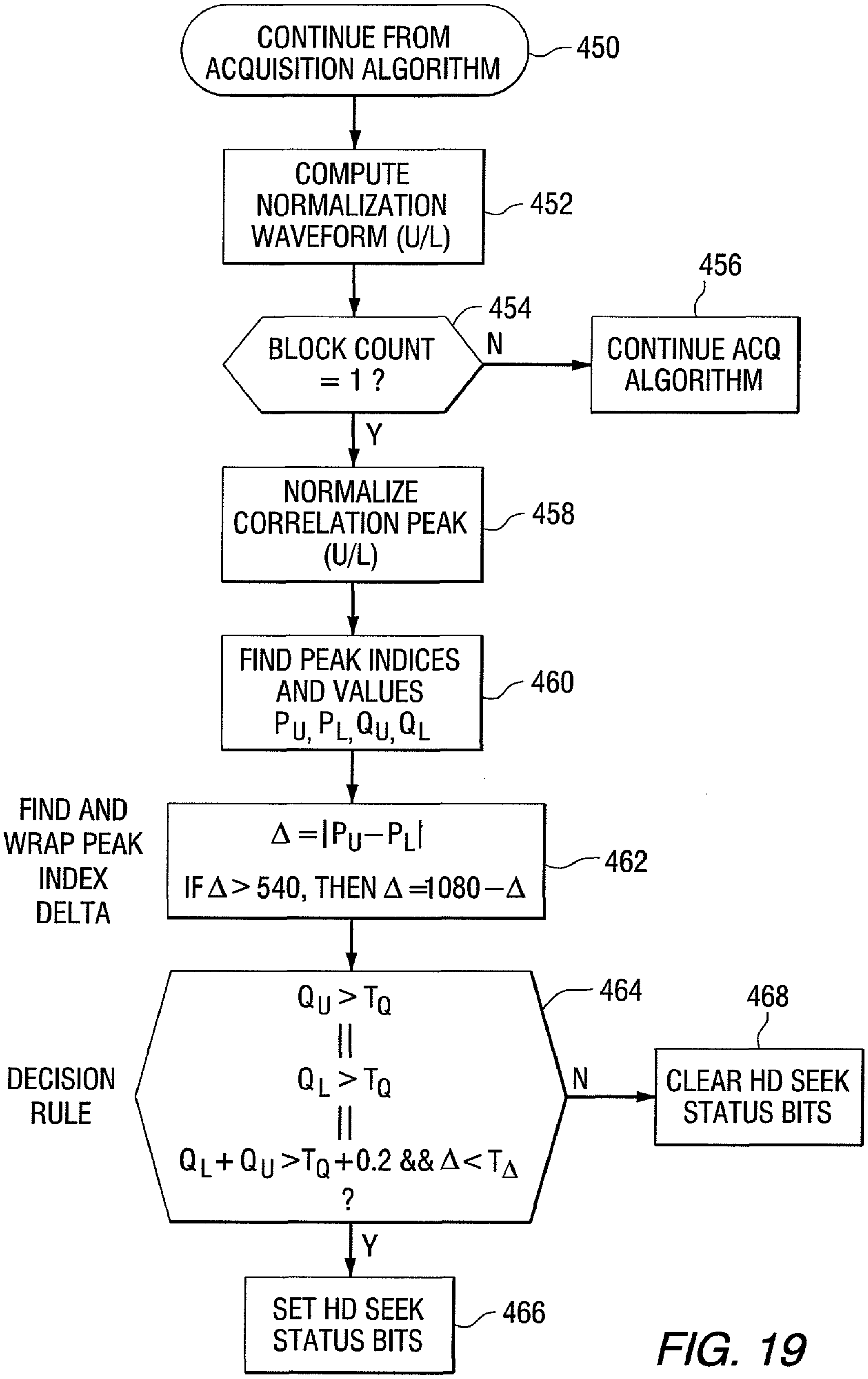
FIG. 19 is a flow diagram of a second portion of signal acquisition processing.
Figure 21:
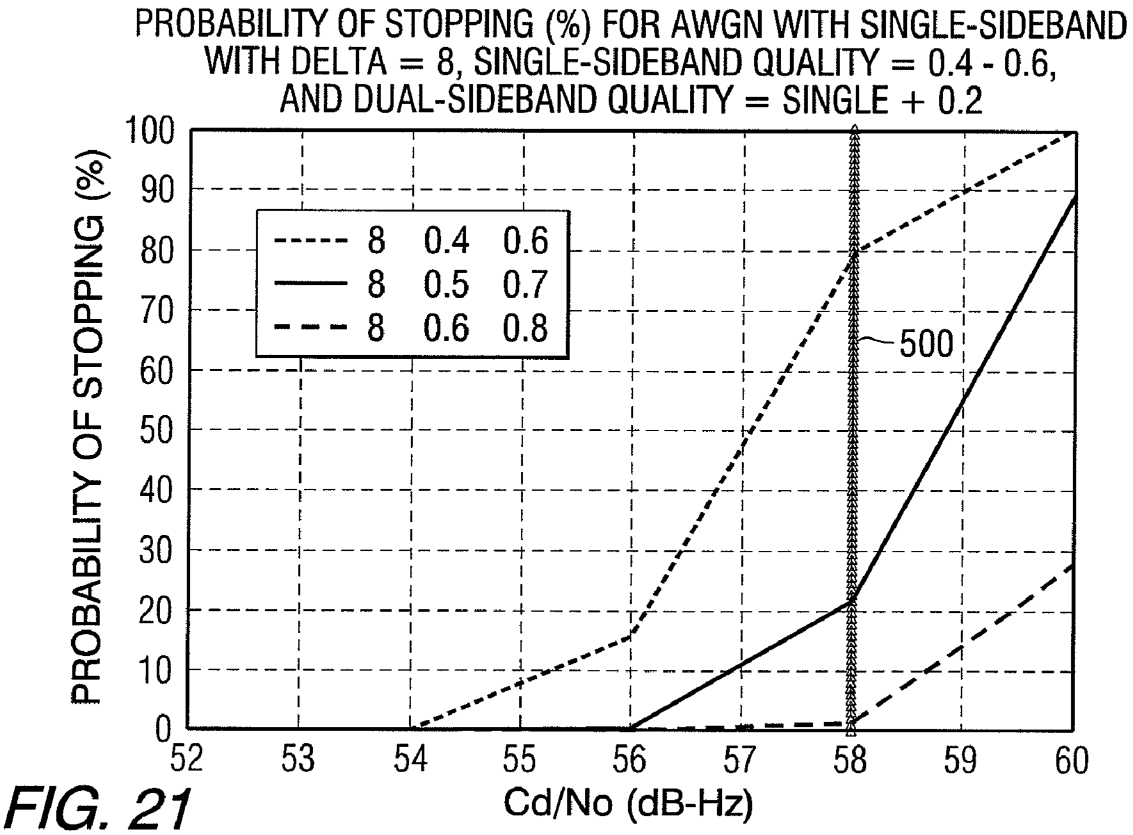
Figure 22:
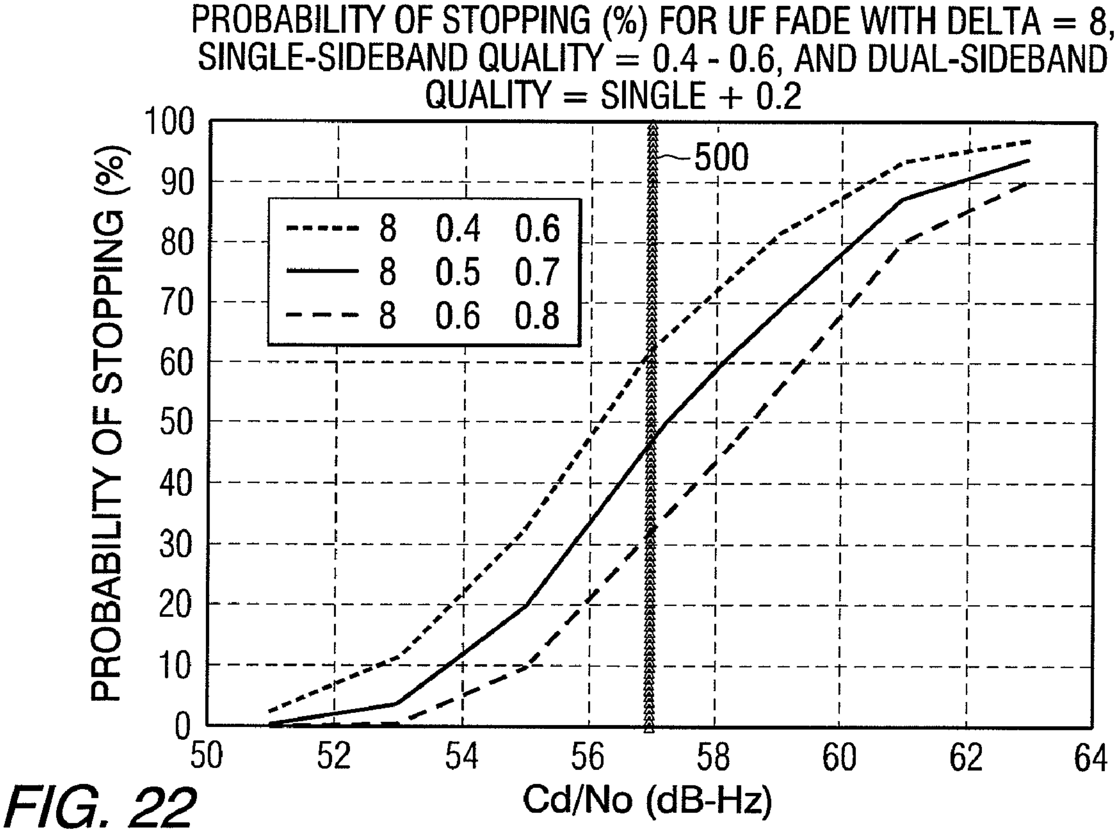
Figure 23:
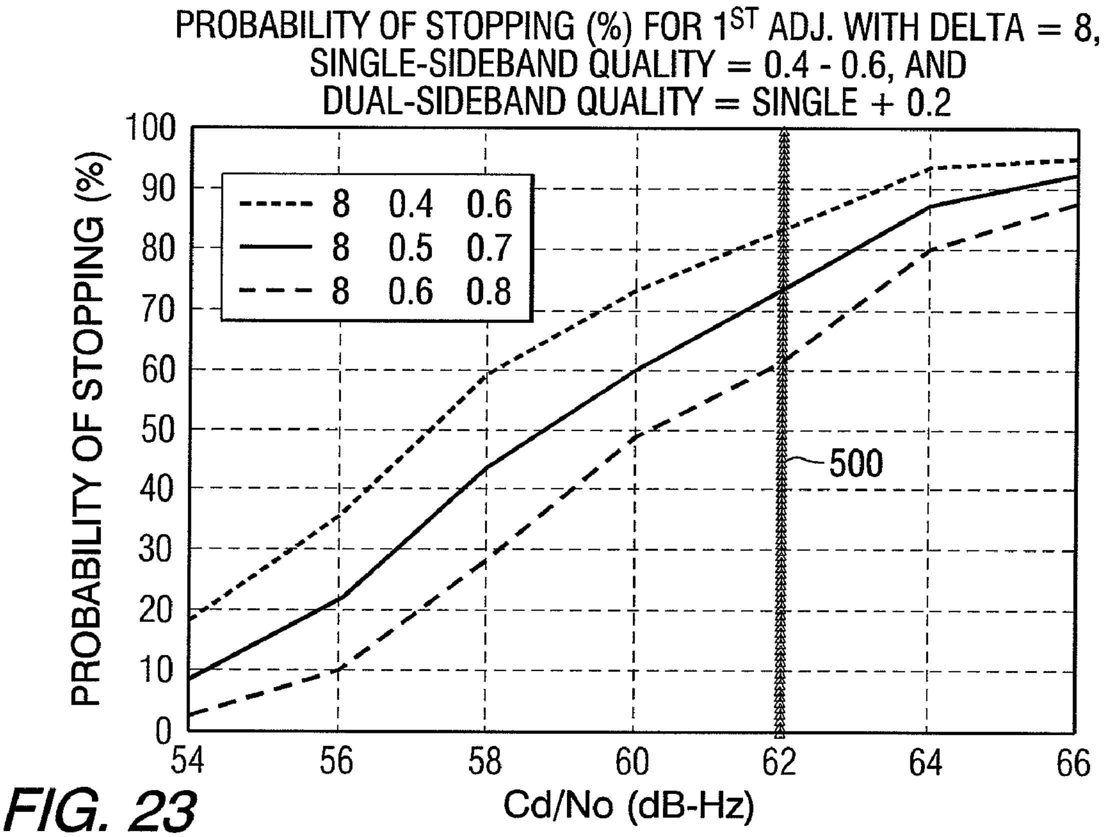

The acquisition algorithm as modified for implementing the seek-scan function is shown in FIGS. 14 and 19. Referring first to FIG. 14, 940-sample filtered data blocks are buffered into 1080-sample symbols, as shown in block 370. As previously described, the first and last 56 samples of each transmitted symbol are highly correlated due to the cyclic prefix. Acquisition processing reveals this correlation by complex-conjugate multiplying each sample in an arbitrary symbol with its predecessor 1024 samples away (block 372). To enhance the detectability of the resulting 56-sample peak, the corresponding products of 16 contiguous symbols are "folded" on top of one another to form a 1080-sample acquisition block (block 374). Sixteen symbols are used, instead of the 32 symbols as described with respect to the previously described acquisition methods, in order to expedite calculation of the seek-scan metric, but any other suitable number of symbols may be used.

The 56-sample folded peak, although visible within the acquisition block, is very noisy. Therefore, block 376 shows that it is smoothed with a 57-tap FIR filter whose impulse response is matched to the shape of the peak:

$$y[n] = \sum_{k=0}^{56} x[n+57-k]h[k] \quad \text{for } n = 0, 1, \ldots, 1079$$

where n is the output sample index, x is the matched-filter input, y is the matched-filtered output, and h[k] is the filter impulse response, defined below.

$$h[k] = \cos\left(-\frac{\pi}{2} + \frac{k \cdot \pi}{56}\right) \quad \text{for } k = 0, 1, \ldots, 56.$$

Taking the magnitude squared of the matched-filtered outputs (block 378) simplifies symbol boundary detection by converting complex values to real values. This computation increases the dynamic range of the input, making the symbol boundary peak even less ambiguous and allowing the peak search to be conducted over a single dimension (versus two dimensions for the I and Q values). The magnitude-squared calculation is:

$$y[n]=I[n]^2+Q[n]^2 \text{ for } n=0, 1, \ldots, 1079$$

where I is the real portion of the input, Q is the imaginary portion of the input, y is the magnitude-squared output, and n is the sample index. The upper sideband and lower sideband matched-filtered, magnitude-squared output waveforms for the first 16-symbol block are used by the seek-scan algorithm to generate the seek-scan metric. As shown in block 380, the acquisition process continues, as described above, and the seek-scan algorithm continues, as shown in FIG. 19 (block 450).

The next step in the seek-scan algorithm is to calculate a normalized correlation peak (blocks 452-458) in order to achieve improved discrimination of the symbol boundary peak. Normalizing the correlation peak provides a basis for assessing the quality of the signal and indicates the probability that there is a digital signal present. The peak value of the normalized correlation peak can range from zero to one, with a value of one indicating the maximum likelihood that a digital signal is present. The peak value of the normalized correlation peak thereby provides a digital signal quality metric.

Figure 15:
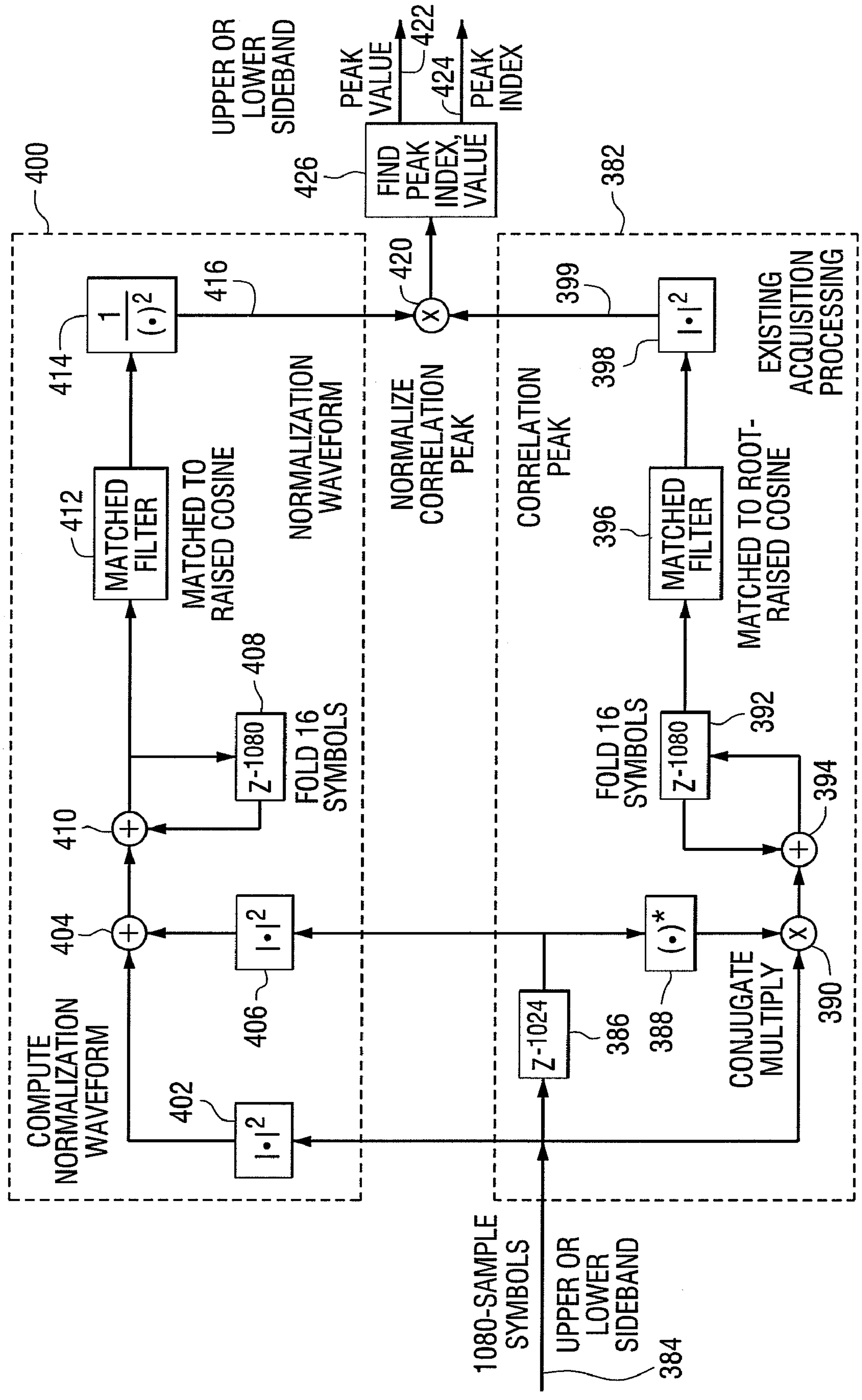
FIG. 15 is a functional block diagram that illustrates an acquisition algorithm.

Circuitry according to the existing algorithm for calculating a correlation peak is shown in box 382 of FIG. 15. The input 384 is a 1080-sample symbol received on either the upper or lower sideband. The input samples are shifted by 1024 samples 386 and the complex conjugate 388 of the shifted samples is multiplied 390 by the input samples. Sixteen symbols are folded as shown by block 392 and adder 394. The folded sums are filtered 396 by root-raised cosine matched filter and magnitude squared 398 to produce a correlation peak 399. Thus, the acquisition algorithm finds a symbol boundary by multiplying a current input sample by the complex conjugate of the input delayed by 1024 samples. At the start of a symbol, the phase of the conjugate product over the next 56 samples is effectively zero for each OFDM subcarrier. The constituent OFDM subcarriers combine coherently over this period, but not over the remainder of samples in the symbol. The result is a discernible correlation peak 399 after 16 symbols are folded and matched filtering is applied.

Figure 17:
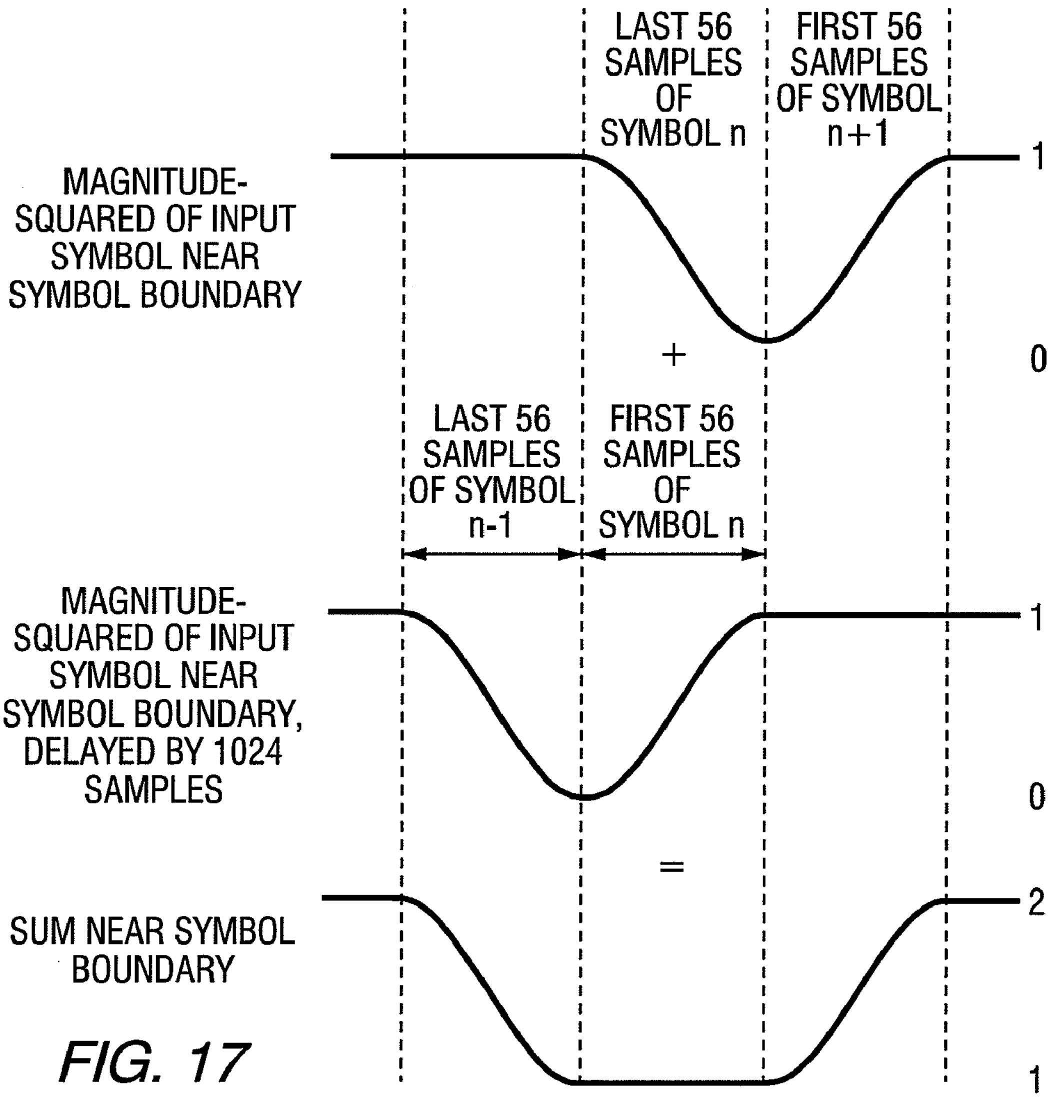
FIG. 17 is a diagram that illustrates waveform normalization near a symbol boundary.

Referring again to FIG. 19, additional processing steps according to the present invention are shown. The normalized correlation peak is determined by first calculating a normalization waveform for each of the upper and lower sideband waveforms (block 452). This normalization waveform exploits an amplitude correlation between the first and last 56 samples of an OFDM symbol due to the root-raised cosine pulse shaping applied at the transmitter. Referring to FIG. 15, block 400 illustrates the computation of the normalized waveform 416. The magnitude squared 406 of each input symbol is delayed 386 by 1024 samples and added 404 to the current magnitude-squared samples 402. Sixteen symbols are folded as shown by block 408 and adder 410. The folded sums are raised-cosine matched filtered 412, and squared and reciprocated 414 to produce a normalization waveform 416. The folding and matched filtering of the normalization waveform is identical to that performed in the existing acquisition algorithm, except the existing matched filter taps are squared and halved to ensure proper normalization:

$$g[k] = \frac{h[k]^2}{2} \quad \text{for } k = 0 \ldots 56$$

where k is the index of taps in the matched filters, h[k] are the existing taps for the conjugate-multiplied correlation peak, and g[k] are the new taps for the normalization waveform. After folding the first 16 symbols and matched filtering, a symbol boundary is apparent. As shown in FIG. 17, the location of the symbol boundary is marked by a reduction in amplitude of the resultant waveform.

Figure 18:
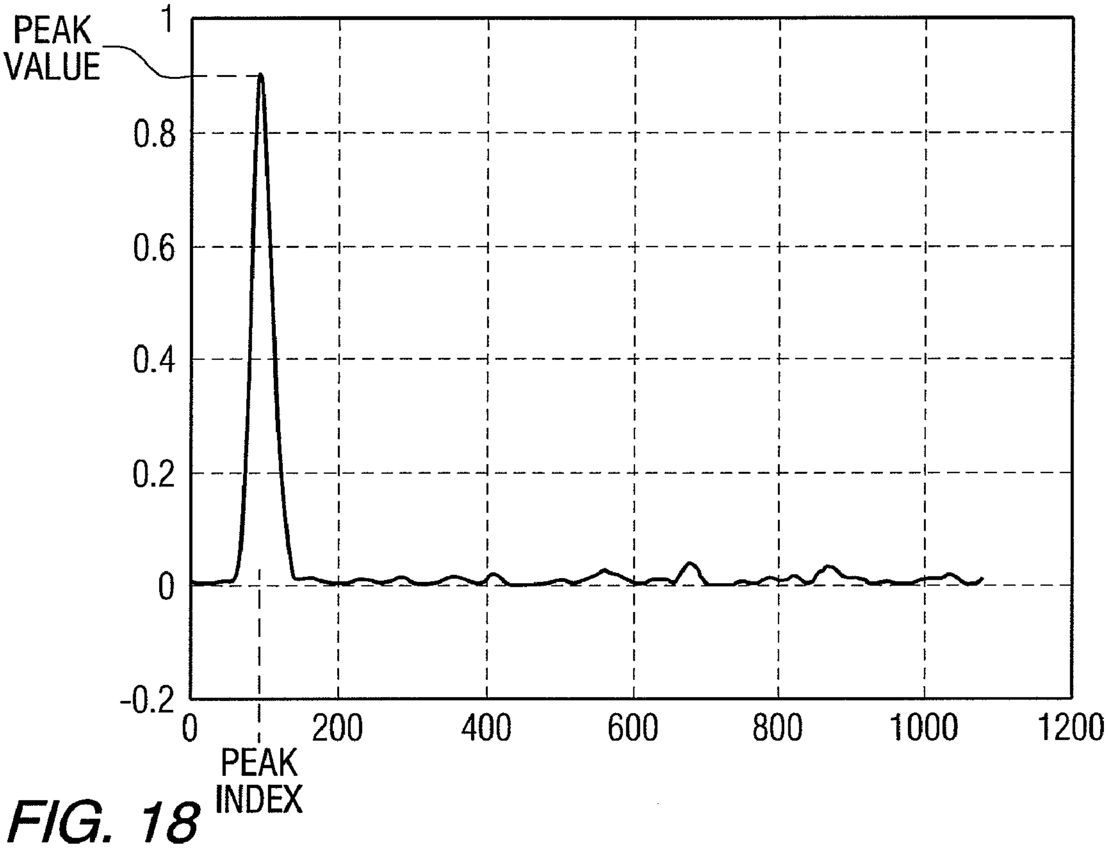
FIG. 18 is a graph of a normalized correlation peak.
Figure 20:
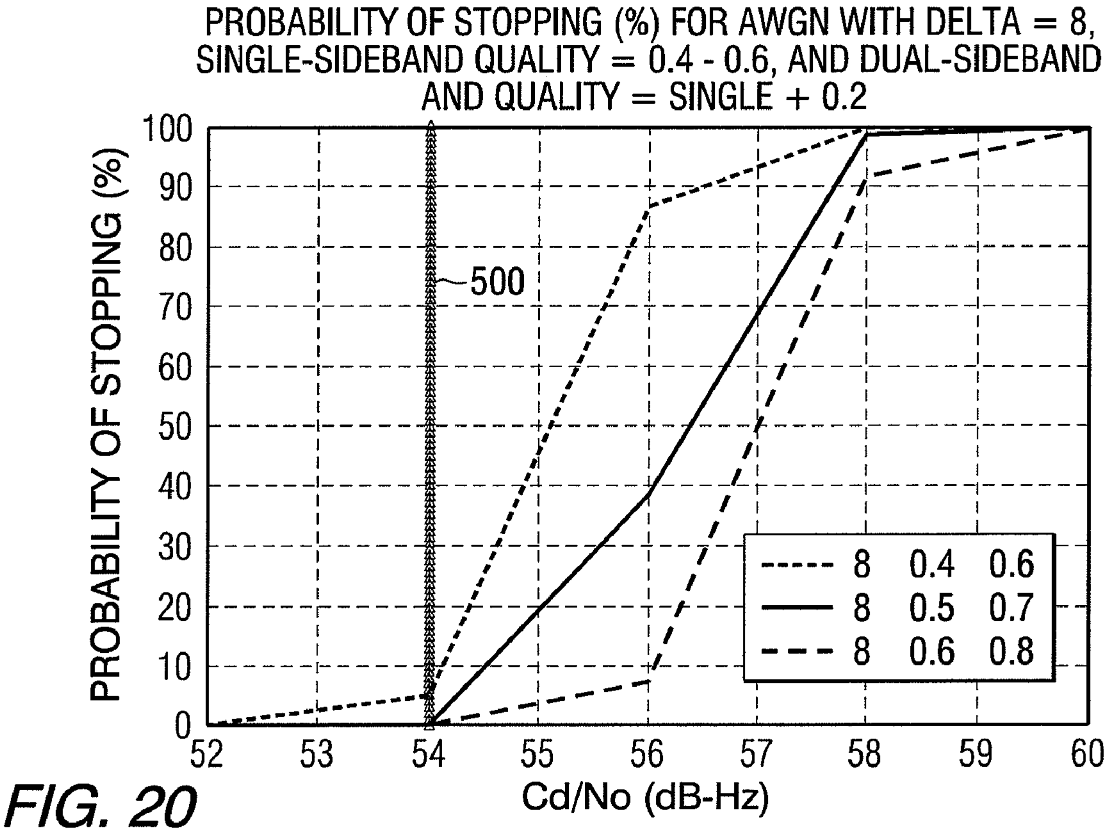
FIGS. 20 through 24 are graphs of the probability of stopping at a particular frequency for various conditions.

Referring again to FIG. 19, once the normalization waveform is calculated, the next step is to determine whether the collected samples are from the first block of 16 symbols received after tuning. If not, then the acquisition algorithm continues (block 456) as described in the previous section. If so, then the seek-scan algorithm continues with block 458, normalization of the correlation peak. Normalization of the correlation peak 399 with the normalization waveform from block 452 enhances the correlation peak by reducing the level of all samples except those coincident with the symbol boundary. Referring again to FIG. 15, the correlation peak 399 is multiplied 418 by the normalization waveform 416 to produce a normalized correlation peak 420. FIG. 18 shows an example of a normalized correlation peak in a relatively clean environment, where the x-axis represents the sample number and the y-axis is the normalized correlation value.

Once the correlation peak is normalized, the next step in the seek-scan algorithm is to find peak indices $P_U$ and $P_L$ and peak values $Q_U$ and $Q_L$ (FIG. 19, block 460). The peak index is the sample number corresponding to the maximum value of the normalized correlation waveform. $P_U$ and $P_L$ are the peak indices of the normalized correlation waveform for the upper and lower sidebands, respectively. Peak value is the maximum value of the normalized correlation waveform and provides a digital signal quality metric.

In order to sufficiently reduce the probability of false alarms and missed stations, a quality estimate from each sideband is used. The peak values of the normalized correlation waveform are representative of the relative quality of that sideband:

$$Q_U = x(P_U)$$

$$Q_L = x(P_L)$$

where x is the normalized correlation waveform, $Q_U$ is the upper sideband quality, and $Q_L$ is the lower sideband quality. Referring to FIG. 15, the peak index 424 is identified and peak quality value 422 is calculated for a sideband by 426.

Next, a peak index delta is found and wrapped (FIG. 19, block 462). The peak index delta compares the peak indices of the upper and lower sidebands for the first sixteen-symbol block:

$$\Delta = |P_U - P_L|.$$

Because the symbol boundaries are modulo-1080 values, the computed deltas must be appropriately wrapped to ensure that the minimum difference is used:

$$\text{If } \Delta > 540, \text{ then } \Delta = 1080 - \Delta.$$

A peak index delta of zero indicates that the peak indices from each sideband are identical, thereby representing the maximum assurance that the normalized correlation peaks from each sideband correspond to the presence of a valid digital signal.

Figure 16:
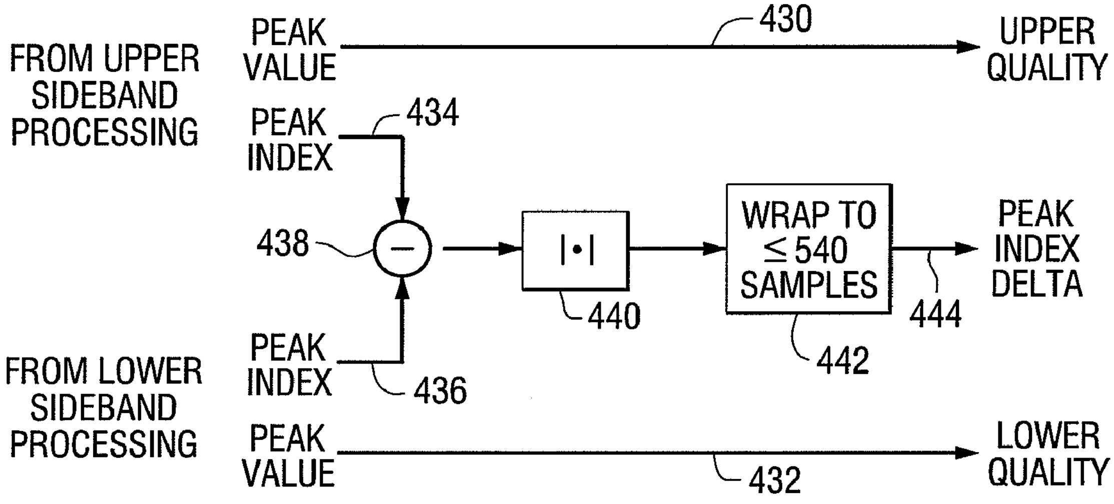
FIG. 16 is a functional block diagram of sideband combination.

Referring to FIG. 16, the peak values and indices from the individual sidebands (FIG. 15, items 422 and 424) are combined to produce the peak delta and quality estimates. The peak correlation value 430 from the upper sideband signal processing is representative of the upper sideband signal quality. The peak correlation value 432 from the lower sideband signal processing is representative of the lower sideband signal quality. The difference between the peak index 434 from the upper sideband signal processing and the peak index 436 from the lower sideband signal processing is determined by subtracting one index from the other as shown by subtraction point 438. The absolute value of the difference is determined (block 440) and the signal is wrapped to ≦540 samples (block 442) to produce a peak index delta 444. The signal is wrapped to ≦540 samples because the symbol boundary offset is modulo-½ symbol, meaning that the distance to the nearest symbol boundary is always ≦540 samples.

Once the peak index delta and quality estimates have been computed, they are compared to thresholds to determine whether the receiver should dwell on the current frequency or tune to the next channel (FIG. 19, block 464). The decision rule separately examines the quality for each individual sideband, in addition to evaluating the peak index delta and sum of the quality estimates from both sidebands. In this way, a station can be successfully detected even when one of its sidebands has been destroyed by interference.

While the decision rule may be implemented in various ways, in one embodiment, the decision rule declares a valid digital signal if:

$$(Q_U \geqq T_Q)$$

OR $$(Q_L \geqq T_Q)$$

OR $$(Q_L + Q_U \geqq T_Q + 0.2 \text{ AND } \Delta \leqq T_\Delta)$$

where $T_Q$ and $T_\Delta$ are the decision thresholds for the quality estimates and peak index delta, respectively. If the decision rule is satisfied, the receiver will set a seek-scan status flag and dwell on the current channel (block 466); otherwise, the receiver will clear the seek-scan status flag and tune to the next channel (block 468). If the user has requested a seek function, then the host controller can dwell on the current frequency until commanded to do otherwise; if the user has requested a scan function, then the host controller can dwell on the current frequency for a predetermined period of time, such as 3 seconds, before searching for the next station.

The example described above implements the seek-scan function using fixed decision thresholds. Alternatively, a seek-scan status parameter reflecting different levels of sensitivity can be used to implement the seek-scan function. In one example, the seek-scan status parameter is a 2-bit value that indicates to the host controller of a digital radio receiver the quality of the currently tuned channel. The baseband processor must select the largest $T_Q$ that satisfies the decision rule for a given $T_\Delta$. One possible bit assignment, determined empirically for $T_\Delta$=8 samples, is shown below:

$$T_Q < 0.40 \rightarrow 00$$

$$0.4 \leqq T_Q < 0.5 \rightarrow 01$$

$$0.5 \leqq T_Q < 0.60 \rightarrow 10$$

$$T_Q \geqq 0.6 \rightarrow 11.$$

For each channel, the baseband processor would apply the decision rule with $T_\Delta$=8 over the range of $T_Q$ listed above. If the decision rule were satisfied only when $T_Q$<0.4, the signal would not be reliable enough. In that case, the seek-scan status bits would be set to 00, which would signal the host controller to tune to the next channel. However, if the decision rule were satisfied with $T_Q$ as high as 0.57, for example, then the seek-scan status bits would be set to 10. The host controller would then compare those status bits to its own threshold to determine whether to remain on that channel. Thus, receiver manufacturers have the ability to adjust the sensitivity of the seek-scan algorithm by varying the threshold of the seek-scan status bits. The quality of the received signal increases as the status bits change from 00→11. This implies that the probability of missing a good signal increases, and the probability of stopping on a bad signal decreases, as the seek-scan status approaches 11.

Based on empirical measurements, stopping when the seek-scan status bits are 10 or 11 is recommended. In this case, the host controller could simply mask the most significant bit (MSB) of the seek-scan status bits: 1 would indicate that the receiver should dwell on the current channel, and 0 would indicate that the receiver should tune to the next station.

As will be appreciated from reading the above description, the simplicity of the algorithm of this invention limits the required changes to previously known receivers. The extent of the impacts on the baseband processor and host controller of the receiver are as follows.

While processing the first acquisition block, the baseband processor must now calculate the normalization waveform, as illustrated in FIG. 15. This entails computing the magnitude squared of both the current 1080-sample input symbol and a 1024-sample delayed version, adding the magnitude-squared vectors, accumulating the sum over 16 symbols, matched filtering it, and squaring the resulting vector. Besides the increase in MIPS (million instructions per second), additional memory must be allocated for the delay, accumulation, and FIR-filtering operations. The algorithm is run only once per tune, so the impact on MIPS is minimal.

Other changes include normalizing the correlation peak via vector division, finding the peak value and index of the normalized correlation peak, and computing the peak index delta. The baseband processor would then apply the decision rule and appropriately set a new seek-scan status parameter.

The responsibilities of the host controller have been minimized to simplify the implementation of the seek-scan function for receiver manufacturers. To implement the seek-scan function, the host controller tunes the receiver, waits approximately 50 ms, reads the seek-scan status bits, and decides whether to stop or tune to the next channel.

The algorithm has been implemented in a reference receiver, and tested in a variety of environments over a range of carrier-to-noise ratios. Specifically, performance was tested within a number of dB of digital audio threshold in additive white Gaussian noise (AWGN), AWGN with one sideband, urban fast (UF) Rayleigh fading, and UF Rayleigh fading with a −6 dB first-adjacent signal.

At each point, at least 300 re-acquisitions were forced. The peak index delta and quality estimates were logged for each attempt, and the decision rule was applied. The probability of stopping was then computed and plotted over a range of $T_Q$ and $T_\Delta$, to allow judicious selection of those thresholds.

The probability of stopping versus the carrier-to-noise ratio Cd/No in the various environments is shown in FIG. 20 through FIG. 23 with $T_\Delta=8$ and $T_Q$ ranging from 0.4 to 0.6. Over this range of thresholds, the probability of stopping with no input signal is virtually nil. In each figure, digital audio threshold is indicated by a vertical line 500.

Figure 24:
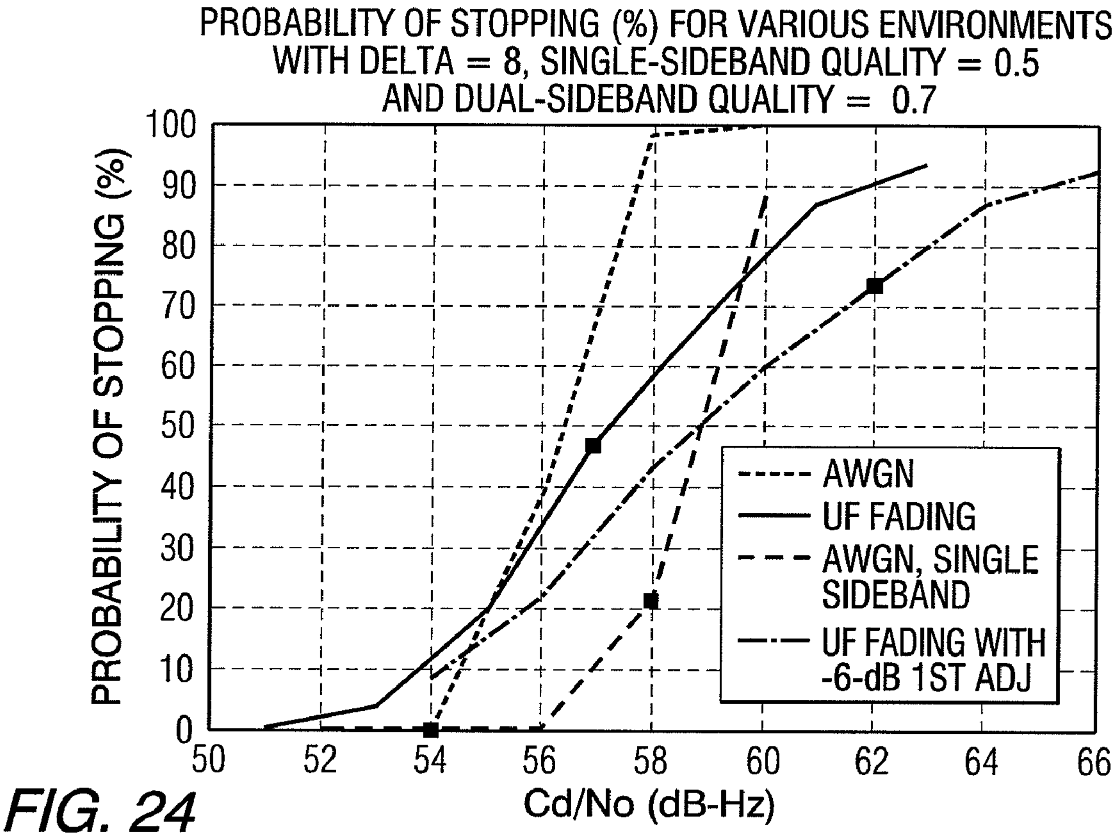

After reviewing the plots in FIG. 20 through FIG. 23, the recommended default thresholds were set as follows: $T_\Delta=8$, $T_Q=0.5$. Over all environments and carrier-to-noise ratios, these thresholds yield the performance that best minimizes the probability of missing strong stations while simultaneously minimizing the probability of falsely stopping on a weak signal. The probability of stopping in the various environments using these default thresholds is shown in FIG. 24. On each curve, digital audio threshold is depicted by a square.

The curves in FIG. 24 indicate that performance in AWGN is quite good. At high carrier-to-noise ratios, the probability of detection is high. Likewise, at low values of Cd/No, the false alarm rate is very low. The steep transition region around digital audio threshold is desirable. In a fading environment, a longer dwell time can be employed to reduce false alarms, at the expense of increased band scanning durations.

This invention provides a method and apparatus that provides fast and accurate seek and scan functions for detecting the presence of an FM digital HD Radio™ signal. The algorithm could be merged with the existing analog FM seek and scan techniques to provide an improved approach to general FM seek and scan functions (for analog, hybrid, and all-digital signals). The methods described herein may be implemented utilizing either a software-programmable digital signal processor, or a programmable/hardwired logic device, or any other combination of hardware and software sufficient to carry out the described functionality.

While the present invention has been described in terms of its preferred embodiment, it will be understood by those skilled in the art that various modifications can be made to the disclosed embodiment without departing from the scope of the invention as set forth in the claims.

What is claimed is:

1. A method for detecting a digital radio signal, the method comprising the steps of:
- receiving a digital radio signal representing a series of symbols;
- developing a correlation waveform having a peak that corresponds to a symbol boundary;
- normalizing the correlation waveform;
- calculating a peak value of the normalized correlation waveform; and
- dwelling on the received digital radio signal when the peak value exceeds a predetermined threshold, wherein the digital radio signal includes a sideband, and the symbols are received on the sideband.

2. The method of claim 1, wherein the digital radio signal includes upper and lower sidebands, and the step of developing a correlation waveform is performed for the upper and lower sidebands of the digital radio signal to produce an upper sideband correlation waveform and a lower sideband correlation waveform.

3. The method of claim 2, wherein the step of normalizing the correlation waveform is performed for the upper and lower sideband correlation waveforms.

4. The method of claim 3, wherein the step of calculating the peak value of the normalized correlation waveform is performed for the normalized upper and lower sideband correlation waveforms.

5. The method of claim 4, wherein the step of dwelling on the received digital radio signal is performed when at least one of the peak values of the normalized upper and lower sideband correlation waveforms exceeds a predetermined threshold.

6. The method of claim 4, wherein the step of dwelling on the received digital radio signal is performed when:
- at least one of the peak values of the normalized upper and lower sideband correlation waveforms exceeds a first predetermined threshold, or
- the sum of the peak values of the normalized upper and lower sideband correlation waveforms exceeds a second predetermined threshold.

7. The method of claim 4, further comprising the steps of:
- determining the peak index of the normalized upper sideband correlation waveform and the peak index of the normalized lower sideband correlation waveform;
- calculating a peak index delta representative of the difference between the peak indices for the normalized upper and lower sideband correlation waveforms; and
- dwelling on the received digital radio signal when:
- the sum of the peak values of the normalized upper and lower sideband correlation waveforms exceeds a first predetermined threshold and the peak index delta is less than a second predetermined threshold.

8. The method of claim 1, wherein the digital radio signal includes upper and lower sidebands, and the samples received on the upper and lower sidebands are processed separately.

9. The method of claim 8, further comprising the step of: filtering each sideband in the digital radio signal prior to the step of developing a correlation waveform.

10. The method of claim 9, wherein the filtering step is performed using a finite impulse response filter.

11. The method of claim 1, wherein the correlation waveform is based on amplitudes of samples of leading and trailing portions of orthogonal frequency division multiplexed symbols.

12. The method of claim 11, wherein the amplitudes of the leading and trailing portions of the orthogonal frequency division multiplexed symbols are tapered.

13. The method of claim 1, wherein the correlation waveform is based on a cyclic prefix applied to orthogonal frequency division multiplexed symbols.

14. A method for detecting a digital radio signal, the method comprising the steps of:

receiving a digital radio signal representing a series of symbols;

developing a correlation waveform having a peak that corresponds to a symbol boundary;

normalizing the correlation waveform;

calculating a peak value of the normalized correlation waveform;

dwelling on the received digital radio signal when the peak value exceeds a predetermined threshold; and setting a status flag to indicate if the receiver should dwell on the received digital radio signal or tune to another channel.

15. A receiver for detecting a digital radio signal, the receiver comprising:

an input for receiving a digital radio signal representing a series of symbols; and a processor for calculating the peak value of a normalized correlation waveform having a peak that corresponds to a symbol boundary, and for causing the receiver to dwell on the received digital radio signal when a peak value exceeds a predetermined threshold, wherein the digital radio signal includes a sideband, and the symbols are received on the sideband.

16. The receiver of claim 15, wherein the digital radio signal has upper and lower sidebands, and the processor calculates the peak values of a normalized upper sideband correlation waveform and a normalized lower sideband correlation waveform.

17. The receiver of claim 16, wherein the processor causes the receiver to dwell on the received digital radio signal when at least one of the peak values of the normalized upper and lower sideband correlation waveforms exceeds a predetermined threshold.

18. The receiver of claim 16, wherein the processor causes the receiver to dwell on the received digital radio signal when at least one of the peak values of the normalized upper and lower sideband correlation waveforms exceeds a first predetermined threshold or the sum of the peak values of the normalized upper and lower sideband correlation waveforms exceeds a second predetermined threshold.

19. The receiver of claim 16, wherein the processor calculates:

a peak index for the normalized upper sideband correlation waveform and a peak index of the normalized lower sideband correlation waveform, and a peak index delta representative of the difference between the peak indices for the normalized upper and lower sideband correlation waveforms; and wherein the processor causes the receiver to dwell on the received digital radio signal when the sum of the peak values of the normalized upper and lower sideband correlation waveforms exceeds a first predetermined threshold and the peak index delta is less than a second predetermined threshold.

20. The receiver of claim 15, wherein the digital radio signal includes upper and lower sidebands, and the samples received on the upper and lower sidebands are processed separately.

21. The receiver of claim 15, wherein the correlation waveform is based on amplitudes of samples of leading and trailing portions of orthogonal frequency division multiplexed symbols.

22. The receiver of claim 21, wherein the amplitudes of the leading and trailing portions of the orthogonal frequency division multiplexed symbols are tapered.

23. The receiver of claim 15, wherein the correlation waveform is based on a cyclic prefix applied to orthogonal frequency division multiplexed symbols.

24. The receiver of claim 15, wherein the predetermined threshold correlates to the sensitivity of the receiver for receiving a digital radio signal.

25. A receiver for detecting a digital radio signal, the receiver comprising:

an input for receiving a digital radio signal representing a series of symbols; and a processor for calculating the peak value of a normalized correlation waveform having a peak that corresponds to a symbol boundary, and for causing the receiver to dwell on the received digital radio signal when a peak value exceeds a predetermined threshold, wherein the processor sets a status flag to indicate if the receiver should dwell on the received digital radio signal or tune to another channel.

26. A receiver for detecting a digital radio signal, the receiver comprising:

an input for receiving a digital radio signal representing a series of symbols;

a processor for calculating the peak value of a normalized correlation waveform having a peak that corresponds to a symbol boundary, and for causing the receiver to dwell on the received digital radio signal when a peak value exceeds a predetermined threshold; and a filter for filtering a sideband in the digital radio signal prior to the processor calculating the peak value of a normalized correlation waveform.

27. The receiver of claim 26, wherein the filter comprises a finite impulse response filter.

28. A receiver for detecting a digital radio signal, the receiver comprising:

an input for receiving a digital radio signal representing a series of symbols; and a processor for calculating the peak value of a normalized correlation waveform having a peak that corresponds to a symbol boundary, and for causing the receiver to dwell on the received digital radio signal when a peak value exceeds a predetermined threshold, wherein the predetermined threshold correlates to the value of one or more seek-scan status bits.

* * * * *